US006301427B1

(12) United States Patent
Kazo

(10) Patent No.: US 6,301,427 B1
(45) Date of Patent: Oct. 9, 2001

(54) VIDEO RECORDER WITH INDEXING AND PROGRAMMING OF MULTIPLE RECORDING MEDIA

(75) Inventor: Kazuya Kazo, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/487,215

(22) Filed: Jan. 19, 2000

Related U.S. Application Data

(62) Division of application No. 08/854,703, filed on May 12, 1997, now Pat. No. 6,035,091, which is a division of application No. 08/387,888, filed on May 19, 1995, now abandoned.

(30) Foreign Application Priority Data

| Jul. 19, 1993 | (JP) | ................................................ P5-198781 |
| Jul. 18, 1994 | (JP) | ..................................... PCT/JP94/01176 |

(51) Int. Cl.⁷ .................................................... H04N 5/76
(52) U.S. Cl. ................................................ 386/46; 386/69
(58) Field of Search ........................... 386/4, 6–8, 45–46, 386/68–70, 81–83, 125–126; 360/27, 69; 348/552; H04N 5/76, 5/781, 5/783

(56) References Cited

U.S. PATENT DOCUMENTS

| 4,338,644 | * | 7/1982 | Staar ........................................ 360/69 |
| 4,553,185 | * | 11/1985 | Poole ..................................... 386/125 |
| 4,963,994 | * | 10/1990 | Levine ................................... 386/83 |
| 5,047,867 | * | 9/1991 | Strubbe et al. ......................... 386/83 |
| 5,130,813 | * | 7/1992 | Oie et al. ............................ 358/909.1 |
| 5,157,511 | * | 10/1992 | Kawai et al. ......................... 386/125 |
| 5,164,839 | * | 11/1992 | Lang ......................................... 360/8 |
| 5,343,450 | * | 8/1994 | Hamada et al. ........................ 369/19 |
| 5,469,307 | * | 11/1995 | Yamada et al. ......................... 360/69 |
| 5,488,409 | * | 1/1996 | Yuen et al. ................................ 348/5 |
| 5,532,830 | * | 7/1996 | Schuler .................................. 386/46 |
| 5,745,640 | * | 4/1998 | Ishii et al. .............................. 386/83 |
| 5,796,538 | * | 8/1998 | Ji et al. .................................. 360/69 |
| 5,796,913 | * | 8/1998 | Takada et al. ....................... 386/125 |
| 6,035,091 | * | 3/2000 | Kazo ..................................... 386/46 |
| 6,091,884 | * | 7/2000 | Yuen et al. ............................. 386/83 |

FOREIGN PATENT DOCUMENTS

| 0 265 167 | * | 4/1988 | (EP) | .............................. G11B/27/00 |
| 6383986 | | 4/1988 | (JP) . | |
| 4291046 | | 10/1992 | (JP) . | |
| 5109240 | | 4/1993 | (JP) . | |

OTHER PUBLICATIONS

International Search Report

* cited by examiner

Primary Examiner—Thai Tran
(74) Attorney, Agent, or Firm—Ronald P. Kananen; Rader, Fishman & Grauer

(57) ABSTRACT

A picture signal recording/reproducing apparatus is disclosed in which a CPU 11 records the identification information for discriminating the video cassette during picture recording on a magnetic tape, while recording the recording information indicating the recording contents, such as the still picture data for program scenes, in memories 13 and 14 in association with the identification information. During reproduction, the CPU 11 reads out still picture data of each program from the memories 13 and 14, while a digital signal processing circuit 15 converts the still picture data of each program as a multi-picture into analog signals which are outputted to a TV receiver via an analog signal processing circuit 23 and an output terminal 33. The result is that the scenes of plural programs recorded in each of plural video cassettes are displayed on the TV receiver. This permits the user to easily recognize the program recorded on the video cassettes and to reproduce the desired program or to record a program in an optimum video cassette.

11 Claims, 21 Drawing Sheets

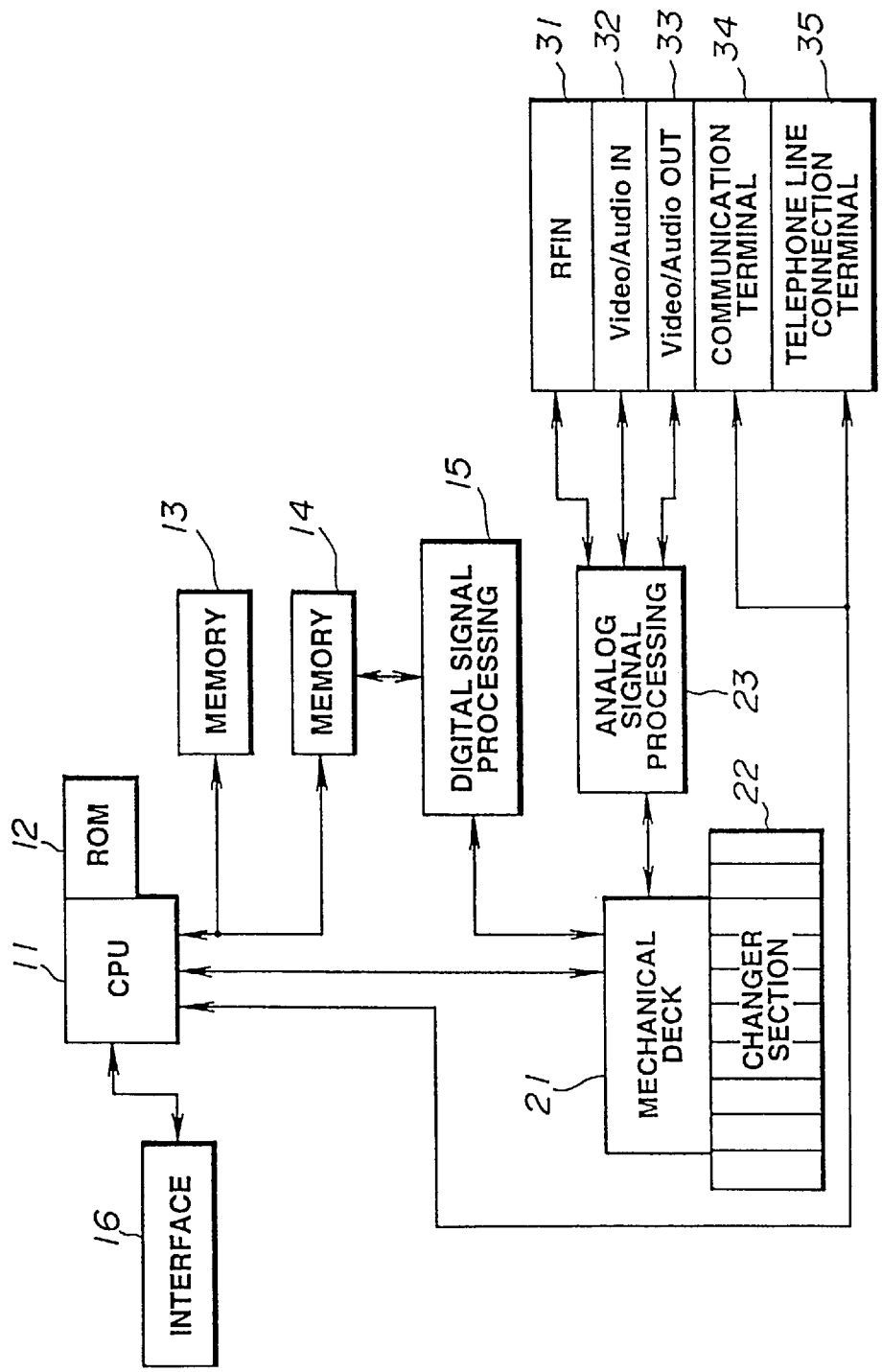

| TAPE MANAGEMENT NUMBER |
|---|
| TAPE EJECTION INFORMATION DATA |
| TABLE ABSOLUTE TIME DATA (RC Time Code) |
| RECORDING DATE AND TIME DATA |
| RECORDING CHANNEL DATA |
| STILL PICTURE ADDRESS |
| GENRE DATA TITLE DATA PERFORMER DATA |
| TAPE CHARACTER INFORMATION DATA (LIBRARY/PERSONAL/FREE) |
| TAPE REPLAY HYSTERESIS DATA (UNREPRODUCED/ PRE-REPRODUCED/REC PROTECT) |

FIG.2

| TIMER RECORDING YEAR, MONTH, DATE DATA |
|---|
| TIMER RECORDING START TIME DATA |
| TIMER RECORDING END TIME DATA |
| TIMER RECORDING CHANNEL DATA |
| TAPE CHARACTER INFORMATION DATA (LIBRARY/PERSONAL/FREE) |

FIG.3

| DRAMA | ENGLISH CONVERSATION | ITALIAN LANGUAGE | NEWS | | | | | | |
|---|---|---|---|---|---|---|---|---|---|
| #1 | #2 | #3 | #4 | #5 | #6 | #7 | #8 | #9 | #10 |

TAPE MAGAZINE ADDRESS

FIG.10

| | | | | | MOM | DAD | HARUMI | ME | |
|---|---|---|---|---|---|---|---|---|---|
| #1 | #2 | #3 | #4 | #5 | #6 | #7 | #8 | #9 | #10 |

TAPE MAGAZINE ADDRESS

FIG.13

VIDEO RECORDER WITH INDEXING AND PROGRAMMING OF MULTIPLE RECORDING MEDIA

This is a divisional application of application Ser. No. 08/854,703 filed on May 12, 1997, now U.S. Pat. No. 6,035,091, which is a divisional application of application Ser. No. 08/387,888 filed on May 19, 1995, now abandoned.

TECHNICAL FIELD

This invention relates to a picture signal recording/reproducing apparatus. More particularly, it relates to a recording/reproducing apparatus for recording picture signals on a recording medium, such as a magnetic tape, and reproducing the recorded picture signals.

BACKGROUND ART

If, with a picture signal recording/reproducing apparatus, such as a video tape recorder (VTR), the recorded contents, such as program title, are recorded as a memo on a back label of a video cassette which houses a magnetic tape having the picture information recorded thereon, and the desired program is reproduced, it has been necessary to search for the desired program by noting the VTR counter information or the video index search system (VISS) or video address search system (VASS) of the VHS system based on the memorized contents. However, it is a laborious operation to record the title, such that, if there is no memo on the back label or there is an insufficient memo, the user is compelled to view the video cassette at random and to repeat fast feed or rewind in order to search for the desired program.

Specifically, with reference to a flow chart of FIG. 23, the user, aware of the video cassette on which the program he or she desires to view is recorded at step ST1, moves to step ST2. If the user is not aware, he or she moves to step ST6.

At step ST2, if the desired first program is recorded beginning from the leading end of a tape, and a desired second program is recorded at a mid area of the tape, the user loads the video cassette on the VTR and moves to steps ST3 or ST4 when he or she desires to view the first program or the second program, respectively.

At step ST3, the user rewinds the tape to its leading end before moving to step ST5.

At step ST4, the user rewinds and fast feeds the tape, while locating the second program, before moving to step ST5.

At step ST5, the user proceeds to reproduction so that reproduction by the VTR is started.

On the other hand, at step ST6, the user loads on the VTR the video cassette in which the program he or she desired to view is most likely to have been recorded. The user then moves to step ST7.

At step ST7, the user locates the desired program, as he or she proceeds to reproduction, fast feed or rewind, before moving to step ST8.

If the user has found at step ST8 the program he or she desires to view, he or she moves to step ST5 and, if otherwise, to step ST9.

At step ST9, the user takes out the video cassette in which the desired program is not recorded, and reverts to step ST6. Thus the user is compelled to repeat the operations of the steps ST6 to ST9 until finding the video cassette having the desired program recorded therein. In the flow chart, unidentified parallelepipedic blocks indicate case-by-case conditions.

On the other hand, if, when recording a new program in a pre-recorded video cassette, the pre-recorded contents are not identified due to e.g., lack of a record of the contents on the back label, it is a frequent occurrence that the recording which should be preserved or the recording made by another family member is inadvertently erased, or otherwise a new video cassette has to be used despite the fact that the latter portion of the pre-recorded video cassette remains unrecorded. The result is that the video cassettes devoid of a memo of the recorded program title tend to be increased in number.

There has been marketed a video deck (VTR) in which the information concerning the recording history is offered to the user by the letter or mark information. Specifically, the user causes the recording contents to be stored in a VTR memory and affixes a specified identification seal, e.g., a bar-code, at a pre-set site for identifying the video cassette. For reproduction, the VTR reads the identification seal in order to identify the loaded video cassette for displaying the recording contents stored on the dope on a TV receiver. Thus it is necessary for the user to affix the identification seal and to load the video cassette having the desired program recorded thereon on the VTR by his or her manual operation.

In the case of a professional VTR employed for broadcasting stations or cablecasting stations, there is known a so-called cart system in which plural recording media, such as tapes or disc, are stored, and the recording medium having the specified program recorded thereon is selected and reproduced. However, this cart system is bulky and heavy in weight, while being costly, so that it cannot be adapted to household use.

On the other hand, in conventional VTRs, the operation of so-called timer recording is complicated. Specifically, with reference to flow charts of FIGS. 24 and 25, the user turns the power source of a VTR on in step ST1 before moving to step ST2.

At step ST2, the user selects the video cassette for recording. Such selection of video cassettes includes selecting an unrecorded video cassette, overwritable video cassette or the video cassette the recording contents of which are not known. If the video cassette the recording contents of which are not known is selected, the user moves to step ST4 and, if otherwise, to step ST3.

At step ST3, the user loads the selected video cassette, that is the unrecorded video cassette or the overwritable video cassette, before moving to step ST9.

At step ST4, the user loads the video cassette the recording contents of which are not known, before moving to step ST5.

At step ST5, the user turns on the power source of the TV receiver, before moving to step ST6.

At step ST6, the user changes over the input of the TV receiver to video input, before moving to step ST6.

At step ST7, the user checks to see if overwriting on the video cassette is possible, as he or she performs reproduction, fast feed or the like operations. If overwriting is possible, the user moves to step ST8.

At step ST8, the user rewinds the tape and moves to step ST9.

At step ST9, the user performs an appointment for timer recording, as to e.g. , recording time and date or recording channel, and enters first timer recording data on the VTR, before moving to step ST10.

At step ST10, the user enters, if necessary, the second timer recording data to the VTR, before moving to step ST11.

At step ST11, the user sets the timer recording standby state, whereby the VTR is set to the stand-by state.

At step ST12, and at the first recording time and date, the VTR executes the first timer recording, before proceeding to step ST13.

At step ST13, the VTR erases the first timer recording data, before proceeding to step ST14.

At step ST14, the user dec ides whether or not the second timer recording is to be made on the same video cassette. If the result of decision is YES, the VTR proceeds to step ST16 and, if otherwise, to step ST15.

At step ST15, the user exchanges the video cassettes before moving to step ST16.

At step ST16, and at the second recording time and date, the VTR executes the second timer recording, before proceeding to step ST17.

At step ST17, the VTR erases the second timer recording data. If the first program recorded by the first timer recording or the second timer recording is to be viewed, without taking out the video cassette, on which the recording has been completed, the VTR proceeds to step ST18 or step ST19, respectively. If other wise, the VTR proceeds to step ST21.

At step ST18, the user rewinds the tape to its leading end before moving to step ST20.

At step ST19, the user rewinds the tape and locates the second program, before moving to step ST20.

At step ST20, the user proceeds to a reproducing operation, so that the reproduction by the VTR is started. Thus the user is able to view the program recorded by timer recording.

On the other hand, at step ST21, the user takes out the recorded video cassette, reproduces another video cassette as indicated at step ST22, performs appointment for timer recording on another video cassette as indicated at step ST23 or stores the video cassette thus taken out as indicated at step ST24.

Thus, if the user desires to record or reproduce picture signals or audio signals for motion pictures with the conventional picture signal recording/reproducing apparatus for household use, such as VTR, he or she is compelled to correctly grasp a variety of information data, such as the information as to which program is recorded on the recording medium, in which portion of a recording medium a given program is recorded and in which portion of a given program a given scene is recorded. In addition, it is up to the user to select or exchange the recording media. In addition, a complex operation is involved in the appointment operations for timer recording.

OBJECTS OF THE INVENTION

In view of the foregoing, it is an object of the present invention to provide a picture signal recording/reproducing apparatus in which the recording contents on the recording medium can be identified and in which reproduction of a desired program or recording on a proper recording medium can be performed by a simplified operation.

SUMMARY OF THE INVENTION

A first picture signal recording/reproducing apparatus according to the present invention includes identification information recording means for recording the identification information for identifying a recording medium on the recording medium, and memory means for storing the picture recording information indicating the picture recording contents. The picture recording information is recorded in the memory means in association with the identification information.

A second picture signal recording/reproducing apparatus further includes identification information reproducing means for reproducing the identification information recorded in the recording medium. The recording information corresponding to the identification information reproduced by the identification information reproducing means is read out from the storage means and outputted.

A third picture signal recording/reproducing apparatus according to the present invention is so arranged that the recording information stored in the storage means is the information as to whether or not a pre-recorded program has hitherto been reproduced.

With the above-described picture signal recording/reproducing apparatus of the present invention, the identification information for identifying the recording medium is recorded on the recording medium, while the recording information indicating the recording contents is stored in the memory means. During reproduction, the identification stored in the recording medium is reproduced and the recording information stored in the memory means is read out based on the identification information so as to be displayed on, for example, a TV receiver.

With the above-described picture signal recording/reproducing apparatus of the present invention, the information as to whether or not a pre-recorded program has hitherto been reproduced is stored in memory means. During reproduction, the identification information recorded in the recording medium is reproduced and, based on the identification information, the information as to whether or not a pre-recorded program has hitherto been reproduced is read out so that only the program which has hitherto not been reproduced in reproduced.

BRIEF DESCRIPTION OF THE DRAWINGS

FIG. 1 is a block diagram showing a practical arrangement of a VTR embodying the present invention.

FIG. 2 shows the contents of the recording hysteresis information stored in a VTR memory.

FIG. 3 shows the practical contents of the time recording information stored in the VTR memory.

FIG. 10 similarly illustrates the "program-based recording, full library keeping mode".

FIG. 13 illustrates the "personal-based allocation mode".

PREFERRED EMBODIMENT OF THE INVENTION

Figure 4:
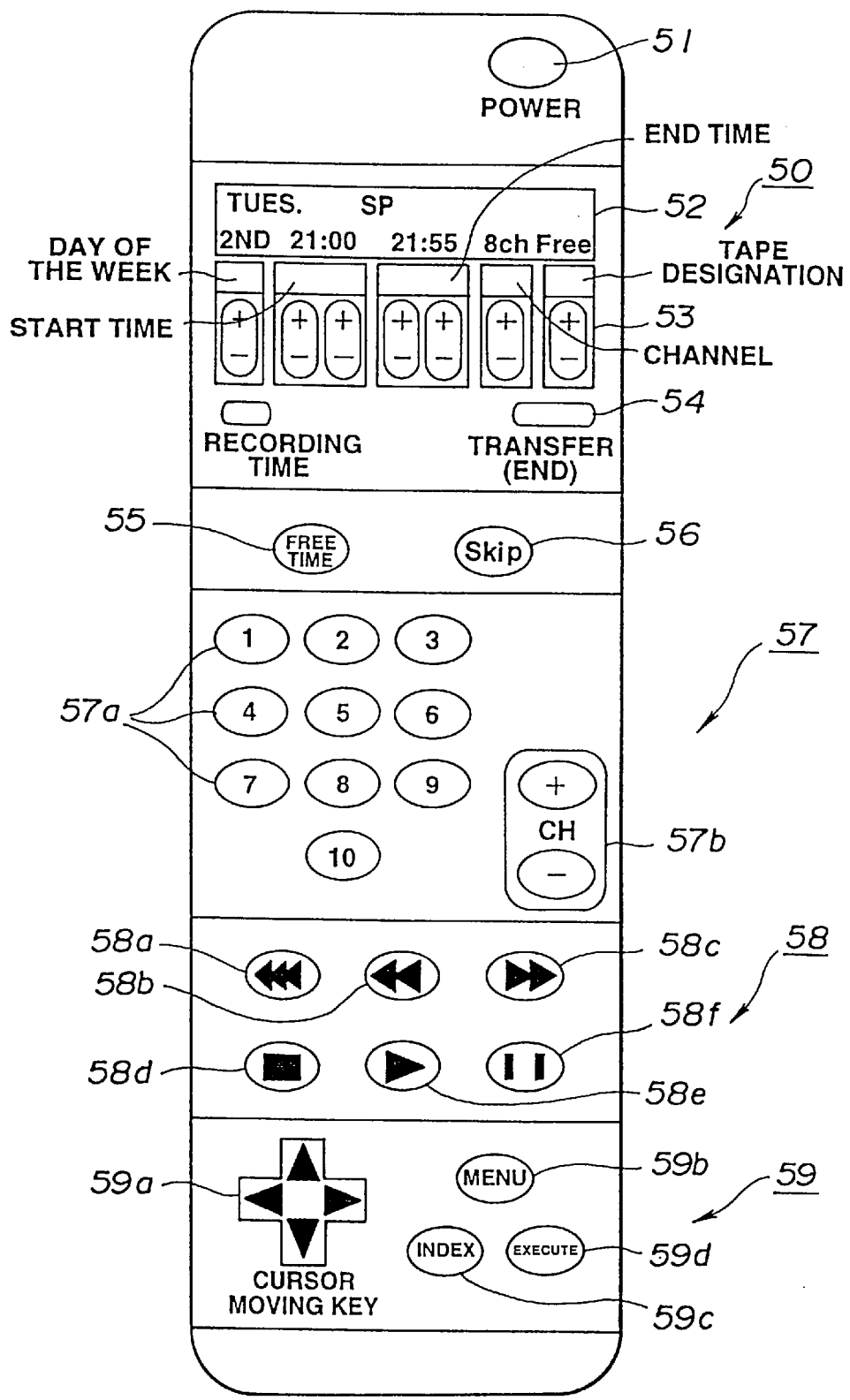
FIG. 4 shows a practical arrangement of button switches on an operating part of a remote controller.

Referring to the drawings, an embodiment of the picture signal recording/reproducing apparatus according to the present invention is explained in detail. In the present embodiment, the recording medium is e.g. a magnetic tape, and the invention is applied to a video tape recorder (VTR).

Referring to FIG. 1, the VTR embodying the present invention includes a micro-computer (CPU) 11 for controlling the operation of recording the discrimination information for discriminating the magnetic tapes on the magnetic tape or reproducing the discrimination information, and a read-only memory (ROM) 12 for storage of a program executed by the CPU 11. The VTR also includes memories 13, 14 for storing the picture recording information indicating the picture recording contents, and a digital signal processing circuit 15 for formulating the still picture data to be stored in the memory 14. The VTR also includes an interfacing circuit 16 for interfacing with the user, and a mechanical deck 21 for recording or reproducing signals on or from the magnetic tape. The VTR also includes a changer unit 22 for storing plural video cassettes housing magnetic tapes and for loading the video cassette on the mechanical deck 21, and an analog signal processing circuit 23 for processing picture and audio signals. The VTR also includes RFIN 31 connected to various external antennas, an input terminal 32 to which base-band picture signals from an external equipment, for example, are inputted, and an output terminal 33 for outputting the base-band picture signals, for example, to external equipment. The VTR finally includes a communication terminal 34 for having communication for controlling the external equipment, such as control-S pr LANC, and a telephone line connecting terminal 35 for remote-controlling the VTR via a telephone circuit.

The VTR records the discrimination information for discrimination of plural video cassettes on a magnetic tape of the video cassette and, when recording picture signals, stores the picture recording information indicating the recorded picture contents in the memories 13 and 14 in association with the discriminated information. The magnetic tape housed within the video cassette is also referred to herein as a video cassette. When reproducing picture signals, the VTR reproduces the discrimination information from the video cassette and reads out the picture recording information associated with the discrimination information in order to output the read-out information at the output terminal 33 and in order to display the picture recording information on e.g., a TV receiver connected to the output terminal 33.

Specifically, the high-frequency picture signals and audio signals supplied via RFIN 31 from the external antenna are fed to the analog signal processing circuit 23 so as to be thereby converted into base-band picture signals and audio signals, both of which are referred to herein as picture signals. The base-band picture signals fed via the input terminal 32 via another VTR are fed to the analog signal processing circuit 23. The picture signals are modulated by the analog signal processing circuit 23 in a manner suited to recording. The modulated signals are supplied to the mechanical deck 21.

The changer unit 22 has a robot mechanism and houses ten video cassettes. The changer unit selects a single video cassette under control by the CPU 11 as later explained and loads the selected video cassette on the mechanical deck 21. The mechanical deck 21 has a rotary magnetic head and a tape guide mechanism and records the modulated picture signals supplied from the analog signal processing circuit 23 on the video cassette.

Picture recording is carried out in this manner. If the VTR is the 8 mm VTR, the CPU 11 records, via the mechanical deck 21, the picture recording date/time data, that is the year, month, day and time of starting and end of the picture recording, and the absolute tape time data, that is the absolute recording start time and absolute recording end time indicating the program recording position on the tape, at the time of recording, as the discrimination information for discriminating the plural video cassettes, at pre-set positions of the RC subcode as prescribed by the 8 mm video tape format.

During such recording, the CPU 11 causes the recording hysteresis information to be stored in the memory 13 each time a program is recorded. The recording hysteresis information includes tape management numbers #1 to #N for discriminating individual video cassettes recorded or reproduced, tape ejection information data indicating whether or not the video cassette is stored at the current time point in the changer unit 22, recording channel data indicating the channel via which the recorded program has been telecast, still-picture addresses indicating the addresses of the memory 14 in which the still picture data as later explained are stored, text data (character data) made up of genre data, title data or performer data, which the user recorded for the program via the interfacing circuit 16, and tape character information data indicating to which characters pertains the video cassette.

The memory 13 is a random access memory (RAM), such as DRAM or SRAM, and stores data having the tape management numbers #1 to #N, as shown in FIG. 2. The tape management numbers #1 to #N are allocated to the video cassettes in a 1-for-1 relationship and data such as the absolute tape time data or recording time and date data are stored each time a program is recorded. The tape playback hysteresis data of the picture recording hysteresis information includes data indicating whether or not the recorded program has been reproduced and data indicating whether or not so-called picture recording protection is to be applied to the program, and is stored at the time of reproduction as later explained.

On the other hand, during picture recording, the CPU 11 causes a scene of a desired program to be stored as still picture data in the memory 14 in order to facilitate retrieval during reproduction of the desired program.

Specifically, the interfacing circuit 16 includes a display unit made up of an LCD panel, an infrared beam receiving unit for receiving the infrared light from a remote controller 50 as later explained, a set of operating buttons, a keyboard and a pointing device, such as a mouse. The CPU 11 controls the digital signal processing circuit 15 during usual real-time program recording or for timer recording for sampling and fetching picture signals supplied from the analog signal processing circuit 23 to the mechanical deck 21 at a period set by the user at the interfacing circuit 16. The digital signal processing circuit 15 converts the sampled one-field or one-frame picture signals into digital signals, and thins out pixels by bit reduction, insofar as the content can be ascertained as the index or the title during retrieval, in order to cause the resulting still picture to be stored in the memory 14. The memory 14 is e.g., a RAM and is located as a lower hierarchical layer. The address on the memory 14 storing the still picture data is stored in the memory 13 as the still picture address, as explained previously.

By thinning out the pixels in this manner, the quantity of data generated for a single still picture can be suppressed to a smaller value, such that the memory capacity and hence the production cost of the memory 14 can be reduced. Conversely, still picture data of a larger number of scenes can be stored. In other words, the number of video cassettes that can be supervised 14. Meanwhile, if pre-recorded video cassettes, such as package media, commercially available software, or video cassettes recorded by a video camera, are reproduced by another VTR and the picture signals supplied via the input terminal 32 are recorded by way of so-called dubbing, the still picture data may be adapted to be stored in the memory 14 only when the user performs the corresponding operation. Although the memories 13 and 14 are constituted by RAMs, so-called flash memories, hard discs or mini-discs may also be employed in view of random accessibility, storage capacity or the read/write speed.

A specific example of timer recording is hereinafter explained.

The VTR records, in addition to the picture recording hysteresis information, the timer recording information, made up of the timer recording year/month/date data, timer recording start time data, timer recording end time data, timer recording channel data and tape character information data, in the memory 13, as shown for example in FIG. 3. These data may be entered by the user with the aid of the remote controller 50 shown in FIG. 4.

The remote controller 50 has, on its operating surface, a power source switch 51, an LCD panel 52 for confirming the contents of timer recording, a set of buttons 53 for setting the recording time and recording channel or the like, a button switch 54 for performing the operation of transferring the pre-set timer recording information to the VTR, a button switch 55 for reproducing only the program which has not been reproduced, a button switch 56 for skipping the program which has been reproduced, a set of button switches 57 for station selection, a set of button switches 58 for reproduction and stop of the VTR and a set of button switches 59 for selection of various modes as later explained.

Figure 5:
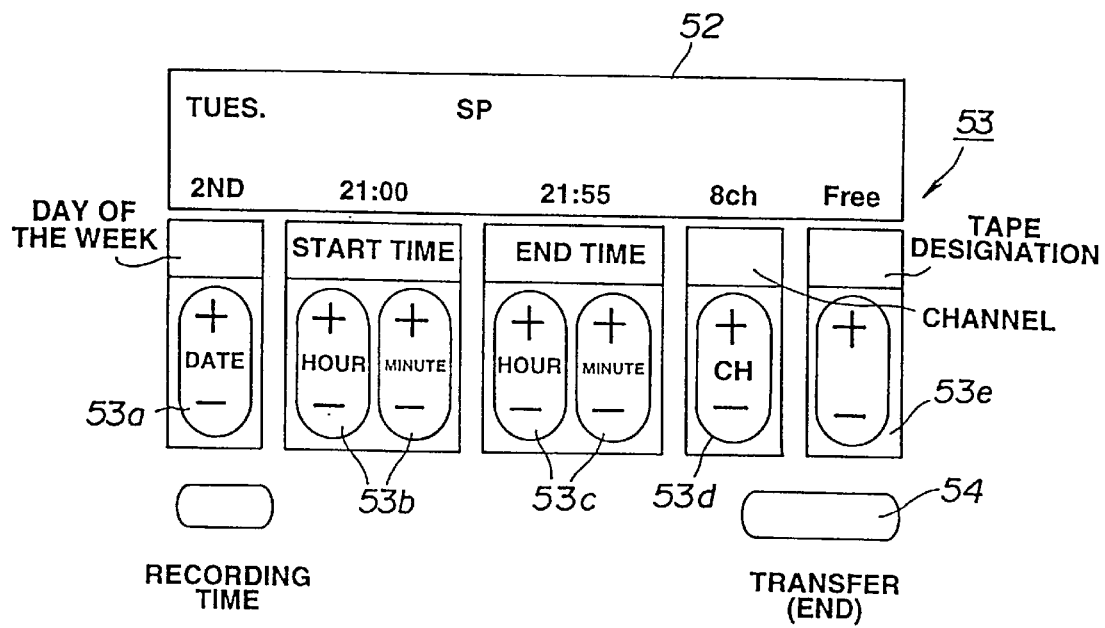
FIG. 5 shows details of the button switches.

The set of button switches 53 is made up of a toggle switch 53a for setting the day of the week, a toggle switch 53b for setting the start time, a toggle switch 53c for setting the recording end time, a toggle switch 53d for channel setting, and a toggle switch 53e for designating the video cassette stored in the changer unit 22, as shown for example in FIG. 5.

The set of button switches 57 has a numerical key switch 57a for designating the channel and a toggle switch 57b for cyclically changing over the channels, as shown in FIG. 4.

The set of button switches 58 includes a button switch for fast rewind, a button switch 58b for rewind, a button switch 58c for fast feed, a button switch 58d for stop, a button switch 58e for reproduction, and a button switch 58g for pause, as shown in FIG. 4.

The set of button switches 59 includes a cursor movement key 59a for moving the cursor, a button switch 59b for starting a menu mode, a button switch 59c for starting the "program retrieval mode" and a button switch 59d for execution of the program as selected during the menu mode, as shown in FIG. 4.

When the user sets the day of the week, start time and end time of picture recording and the recording channel, with the aid of the toggle switches 53a to 53d, while designating the video cassette, with the aid of the tape designating toggle switch 53e, the remote controller 50 causes the contents as set to be displayed on the LCD panel 52, and transmits the contents as set (timer recording information) to the interfacing circuit 16 by infrared rays. The CPU 11 causes the timer recording information to be stored on the memory 13, as shown in FIG. 3.

Specifically, the desired timer recording is set by setting the day of the week, recording start and end time and recording channel by pressing the "+" sides of the toggle switches 53a to 53d for incrementing the numerical indications and by pressing the "−" sides of the toggle switches 53a to 53d for decrementing the numerical indications.

On the other hand, if ten video cassettes, for example, can be housed within the changer unit 22, as explained previously, the tape magazine numbers of #1 to #10 are allocated to the video cassette storage locations (tape magazine units), as counted from the left end. The user pressing the "+" side of the toggle switch 53e for incrementing the numerical indications and by pressing the "−" side of the toggle switch for decrementing the numerical indications for designating the video cassette housed within the desired one of the tape magazine addresses #1 to #10.

Figure 6:
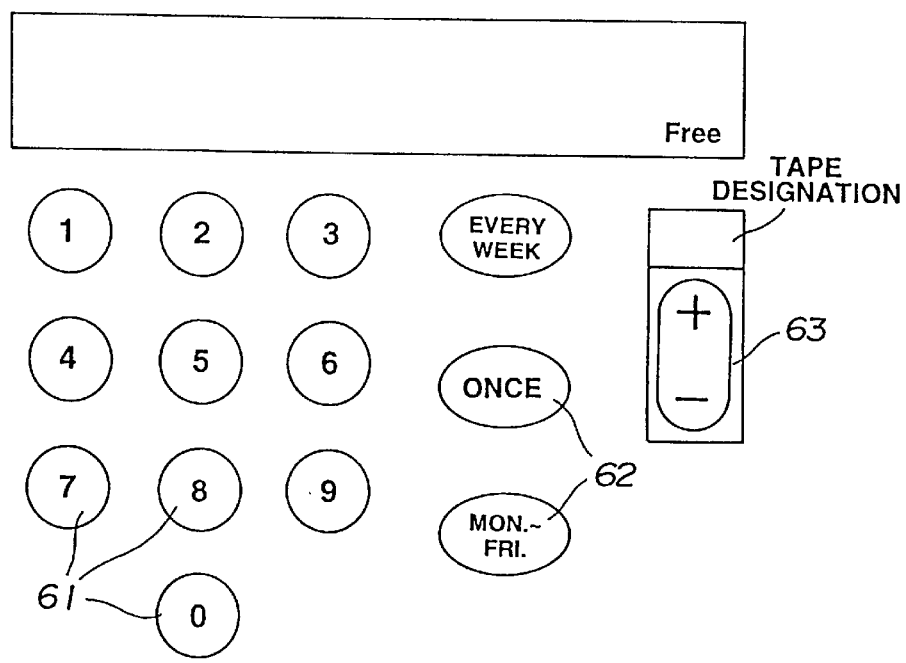
FIG. 6 shows a practical arrangement of the button switches of a remote controller conforming to the G-code.

The tape magazines having the tape magazine numbers #1 to #10 may be previously allocated to family members, such as "dad", "mom", "sister" or "me" (this allocation is referred to herein as personal setting). In addition, the tape magazines may be previously allocated according to libraries, such as program types (this allocation is referred to herein as library setting). For example, characters such as "dad", "mom", "sister", "me", "library", "latest four stories", "latest one story" or "free" may be cyclically displayed on the LCD panel 52 each time the (+) side of the toggle switch 53e is thrust in order to permit the user to designate the video cassette housed within the changer unit 22. The indication "free" means that the tape magazine in subject has not been designated for personal setting nor library setting. The function similar to that of the remote controller 50 may be provided on the operating portion of the main body of the apparatus for setting the timer recording by this operating portion. The remote controller may also be provided with a numerical key switch 61 and a button switch 62 for enabling the timer recording by the so-called G code and for setting the number of times of recording, as well as a toggle switch 63 for designating the video cassette, as shown in FIG. 6.

If the user a presses button switch 54 after setting the timer recording as explained above, the remote controller 50 transmits the timer recording information to the interfacing circuit 16. The CPU 11 causes the timer recording information to be stored in the memory 13.

At the recording start time, the CPU 11 controls various components, based on the timer recording information stored in the memory 13, for recording the program of the designated channel in the designated video cassette.

Figure 7:
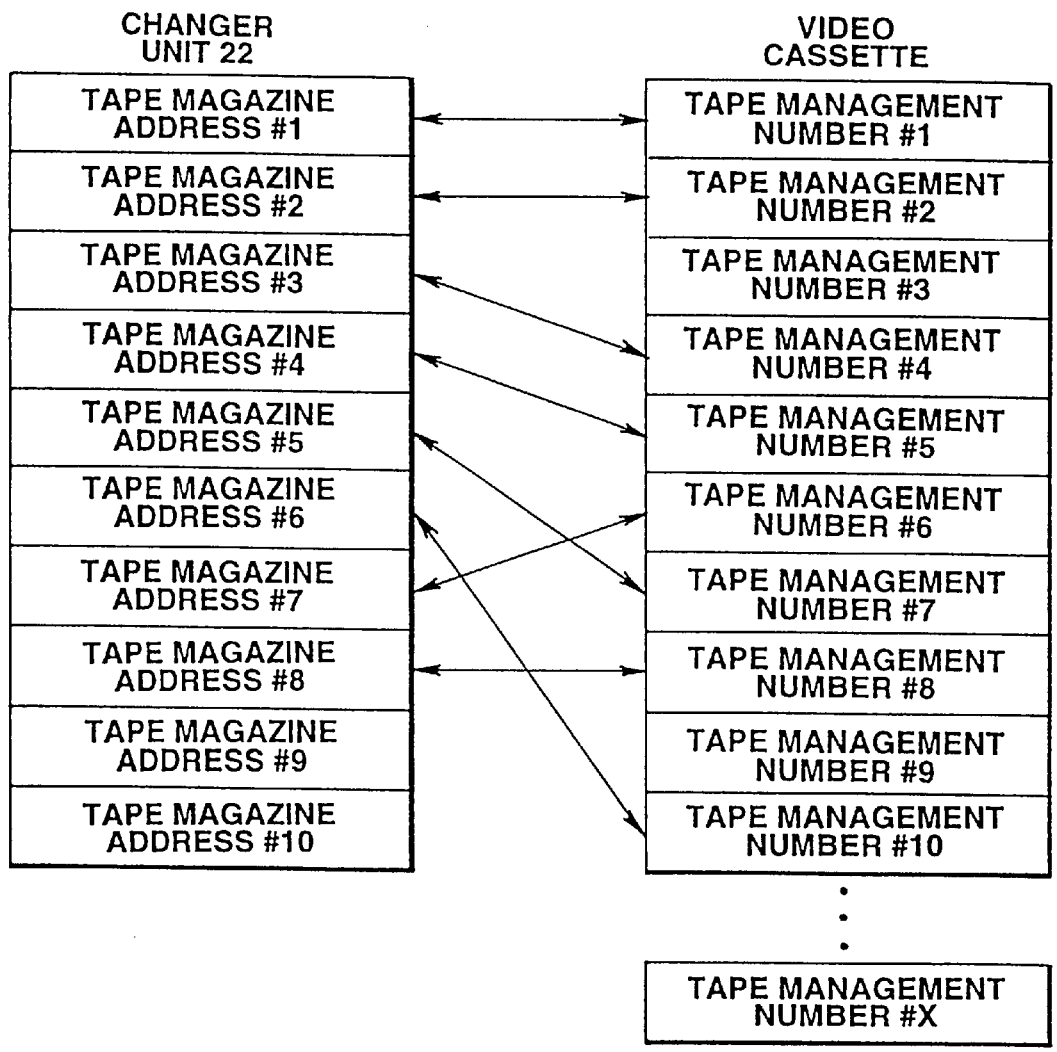
FIG. 7 shows the practical relation between the tape magazine addresses and the tape management numbers.

Specifically, there is recorded in the memory 13 the picture recording hysteresis information, made up e.g., of the tape ejection information data indicating whether or not the video cassette is stored in the changer unit 22, and the tape management numbers #1 to #10, as shown in FIG. 2. Based on the tape management numbers #1 to #10 and the tape ejection information data, the CPU 11 recognizes that the video cassettes having the tape management numbers #1, #2, #4, #5, #7, #10, #6, #8 are sequentially housed in the tape magazines having the tape magazine addresses #1 to #8, as shown in FIG. 7.

The present VTR is designed to record pictures in accordance with three modes, namely the "program-based allocation recording mode" for allocating the video cassettes according to programs, the "personal-based allocation recording mode" for allocating the video cassettes according to persons, and the "free timer recording mode" other than the above "program-based allocation recording mode" and the "personal-based allocation recording mode". These respective recording modes are now explained.

The "program-based allocation recording mode" is classed into "program-based recording, full library keeping mode" in which the program telecast on the same day of the week each week in the same time zone on the same channel is continuously recorded on the video cassette, "program-based recording, latest four story keep mode" in which the latest four stories, for example, of the same program are recorded on the same video cassette, and "program-based recording, latest one story keep mode" in which the latest one story of the same program is recorded on the same video cassette.

Figure 8:
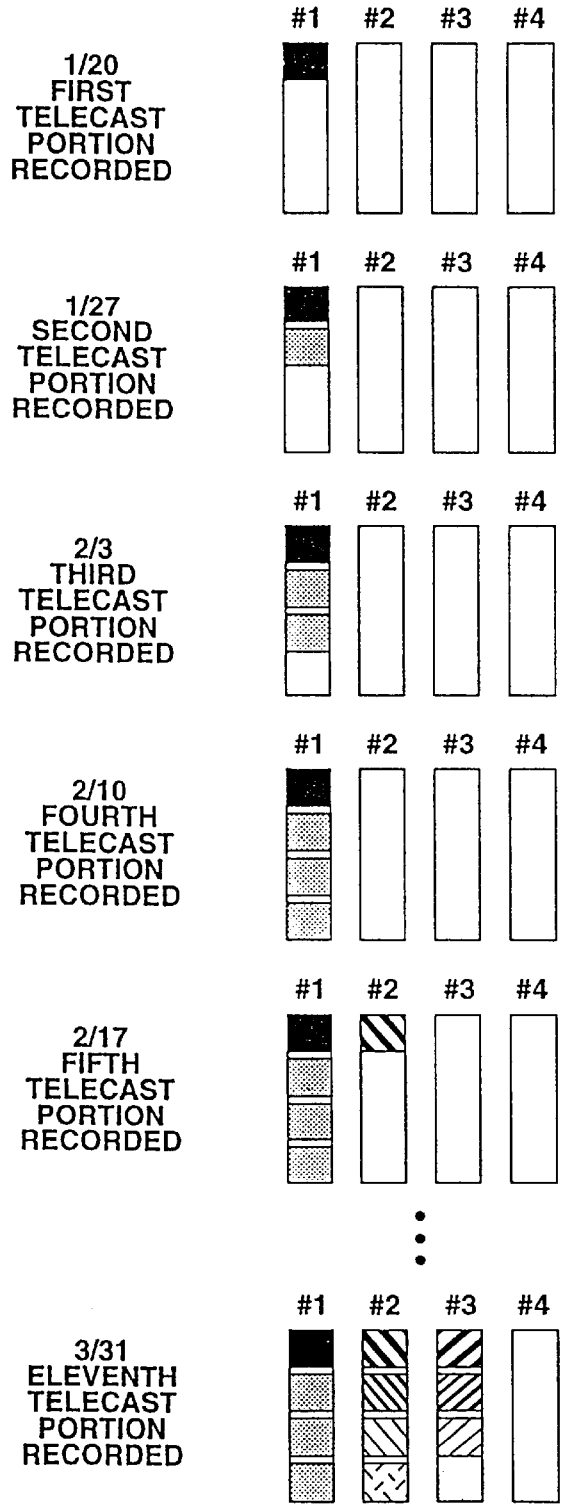
FIG. 8 illustrates the "program-based recording, full library keeping mode".

Assuming that a serial drama consisting of 11 installments, telecast since Jan. 20, 1993 every Wednesday on the 8th channel since 9.00 until 9.55, is to be recorded by a so-called EP mode on a 120-minute video cassette, and that a user sets to the "program-based recording, full library keeping mode" at the time of appointment for timer recording, the CPU 11 causes the first installment (telecast on January 20) to be recorded on a unrecorded video cassette (so-called blank tape) with a tape management number of #1, housed in a tape magazine section allocated to the library, at the time of the first installment, as shown in FIG. 8.

At this time, the CPU 11 also causes information data, such as tape ejection information data, tape absolute time data, recording time and date data, picture recording channel data, still picture address and optionally entered title or the like data, to be stored in the memory 13, while causing tape information data to be stored as the library in the memory 13. The CPU 11 also causes still picture data to be stored in the memory 14 at the pre-set period as mentioned previously.

When the time is the telecast time for the second installment, The CPU 11 compares the tape absolute time data and recording time and date data stored in the memory 13 to the tape absolute time data and recording time and date data reproduced from the video cassette in order to discriminate the video cassette having the tape management number #1 and in order to record the second installment (telecast on January 27) in continuation to the trailing end of the first installment. Similarly to the first picture recording, the recording hysteresis information, inclusive of the tape absolute data, is recorded in the memory 13, while the still picture data is stored in the memory 14. That is, no matter in which tape magazine address the video cassette having the tape management number #1 is housed, the video cassette is automatically identified in order to effect recording.

Figure 9:
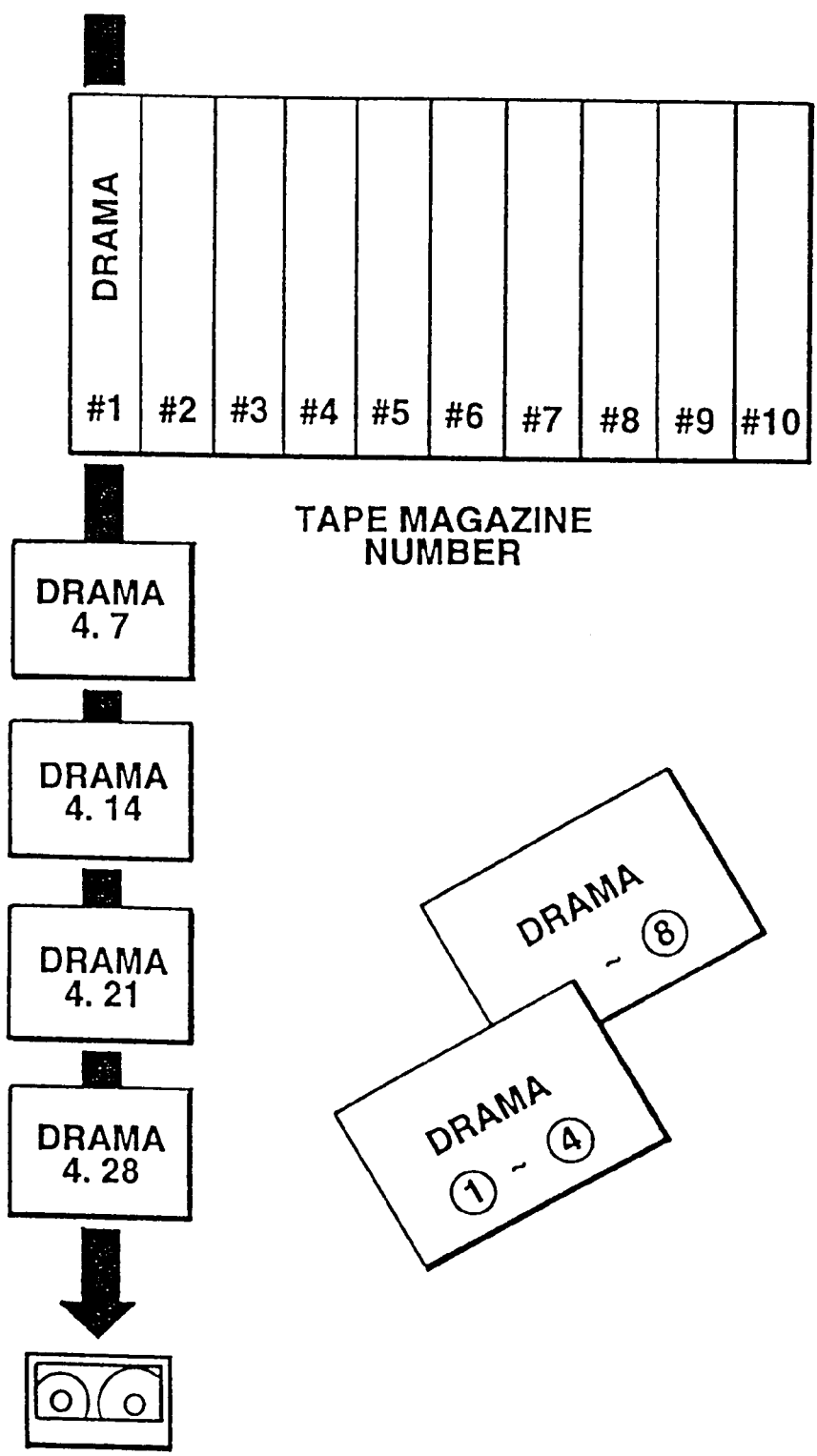
FIG. 9 similarly illustrates the "program-based recording, full library keeping mode".

In a similar manner, the CPU 11 causes the third installment (telecast on February 3) and the fourth installment (February 10) to be sequentially recorded on the video cassette having the tape management number #1. When the video cassette having the tape management number #1 becomes full, the fifth to eighth installments are sequentially recorded on a video cassette having the tape management number #2, and the ninth to eleventh installments are sequentially recorded on a video cassette having the tape management number #3. In this manner, the serial drama may be recorded as a library as shown for example in FIG. 9. On the other hand, a drama telecast in plural installments may be recorded in a video cassette housed in a tape magazine address #1 and plural installments of a program on the English conversation may be recorded on a video cassette having the tape magazine address #2, while plural installments on the Italian conversation may be recorded on a video cassette having the tape magazine address #3 and plural installments of the news program may be recorded on a video cassette having the tape magazine address #4, as shown in FIG. 10. That is, the user may make recording on an optimum video cassette by a simplified operation.

Figure 11:
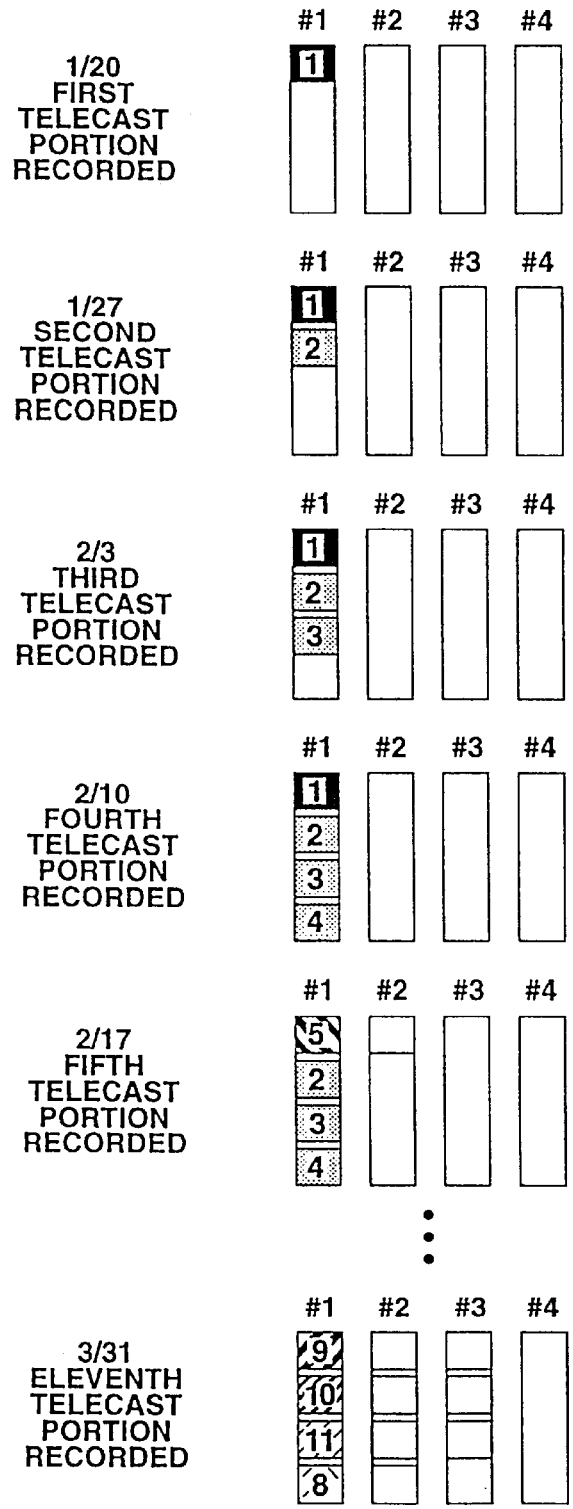
FIG. 11 illustrates the "program-based recording, latest four story keep mode".

If, on the other hand, the user sets the "program-based recording, latest four story keep mode" at the time of appointment for timer recording, for timer recording the same serial drama as that for the "program-based recording, full library keeping mode" as mentioned above, the CPU 11 causes the first installment (telecast on January 20) to be recorded in a blank video cassette with e.g., the tape management number #1 housed in the tape magazine unit allocated to the library, when the time is the telecasting time for the first installation, as shown in FIG. 11. The CPU 11 causes the tape absolute time data or the recording time and date data to be recorded in the memory 13, while causing the tape character information data to be recorded as the library in the memory 14 at the pre-set period. In addition, the CPU 11 causes still picture data to be stored at the pre-set period in the memory 14.

When the time is the telecasting time for the second to fourth installments, the CPU 11 compares the tape absolute time data and recording time and date data stored in the memory 13 to the tape absolute time data and recording time and date data reproduced from the video cassette in order to discriminate the video cassette having the tape management number #1 and in order to record the second installment (telecast on January 27) up to the fourth installment (telecast on February 10) in continuation to the trailing end of the first installment. Similarly to the first picture recording, the recording hysteresis information, inclusive of the tape absolute data, is recorded in the memory 13, while the still picture data is stored in the memory 14. That is, no matter in which tape magazine number the video cassette having the tape management number #1 is housed, the video cassette is automatically identified in order to effect recording.

When the time is the telecasting time for the fifth installment, the CPU 11 causes the fifth installment (telecast on February 17) to be recorded in superimposition on the recording of the first installment of the video cassette having the tape management number #1. In a similar manner, the CPU causes the latest four installments to remain recorded on the video cassette.

Figure 12:
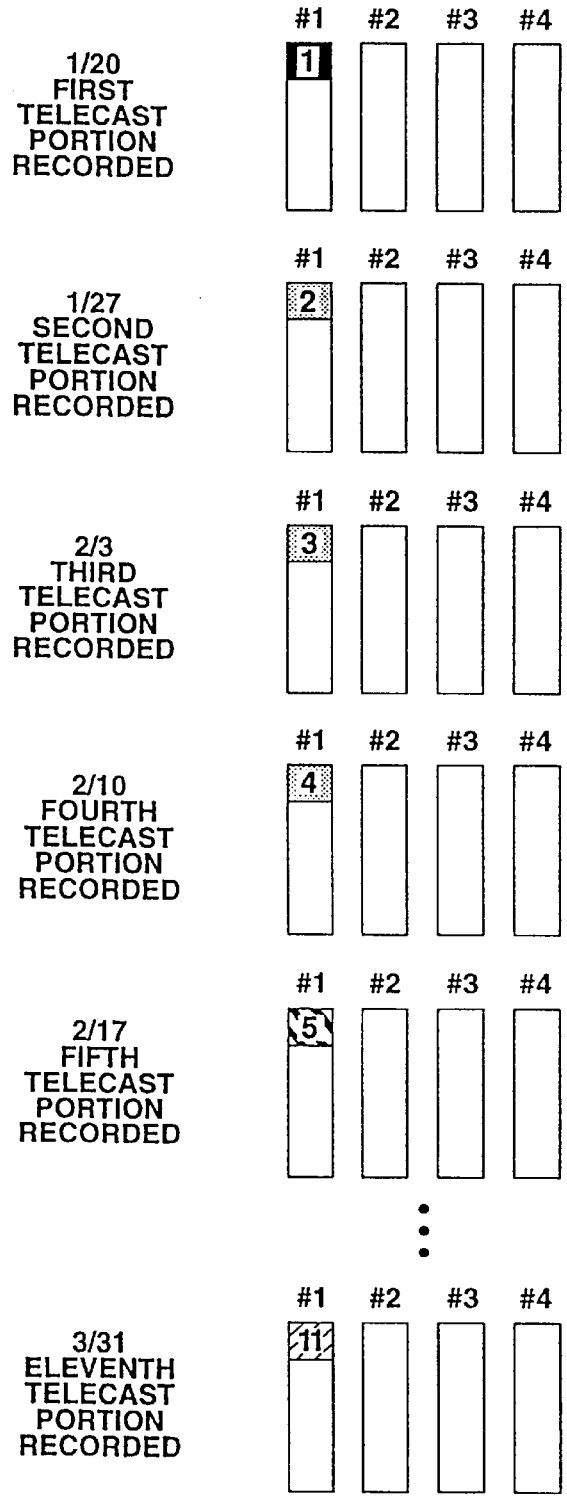
FIG. 12 illustrates the "program-based recording, latest one story keep mode".

If, on the other hand, the user sets the "program-based recording, latest one story keep mode" at the time of appointment for timer recording of the same serial drama as mentioned above, the CPU 11 causes the first installment (telecast on January 20) in a blank video cassette with e.g., the tape management number #1 housed in the tape magazine unit allocated to the library, when the time is the telecasting time for the first installment, as shown in FIG. 12. As in the above-mentioned specific example, the CPU 11 causes the tape absolute time data, recording date and time data or the like to be stored in the memory 13, while causing the tape character information data to be stored as the library in the memory 13.

When the time is the telecasting time for the second installment, the CPU 11 compares the tape absolute time data and the recording time and date data stored in the memory 13 to the tape absolute time data and the recording time and date data reproduced from the video cassette in order to identify the video decassette having the tape management number #1 and in order to record the second installment (telecast on January 27) in superimposition on the recording of the first installation (telecast on January 20) on the video cassette. In a similar manner, the CPU causes the latest installation to remain recorded in superimposition on the video cassette.

The "personal-based allocation recording mode" is now explained. With the personal-based allocation recording mode, the tape magazine units having the tape magazine addresses #6 to #9 are set to "mom", "dad", "Harumi" and "me", as shown for example in FIG. 13. At the time of appointment for timer recording, the user sets the "personal-based allocation recording mode" and enters the personal names using the toggle switch 53e for tape designation. The CPU 11 then causes recording to be made on the video cassette housed within the tape magazine unit associated with the thus set personal name at the recording start time. Thus it becomes possible to prevent mistaken erasure of the video cassette allocated to another family member.

The "free timer recording mode" is now explained. It is assumed that the tape magazine unit having the tape magazine address #1, referred to as the tape magazine address #1, hereinafter the same, is set to the "full library keeping mode", The tape magazine address #2 is set to the "latest four story keep mode", the tape magazine address #3 is set to "latest one story keep mode", the tape magazine addresses #4 to #6 are set to "free" and the tape magazine addresses #9 and #10 are allocated to family members, specifically, "mom" and "dad", respectively, as shown in FIG. 14.

If the user sets the "free timer recording mode" at the time of appointment of timer recording, the CPU 11 identifies the vacant areas of the video cassettes housed within the tape magazine addresses #4 to #6, based on the recording hysteresis information, when the time is the recording time. The CPU 11 then causes the recording to be made in the vacant areas while allocating the ranks of preference to the vacant areas. First, the CPU causes recording to be made beginning from the leading end of the blank tape. Second, if the recordable time for the vacant area is longer than the recording time, the CPU causes recording to be made in the vacant area. Third, if a single vacant area is shorter than the recording time, the CPU causes recording to be made across plural recording areas. For second and third cases, the CPU 11 issues an admonition to the user to get his or her consent.

Figure 14:
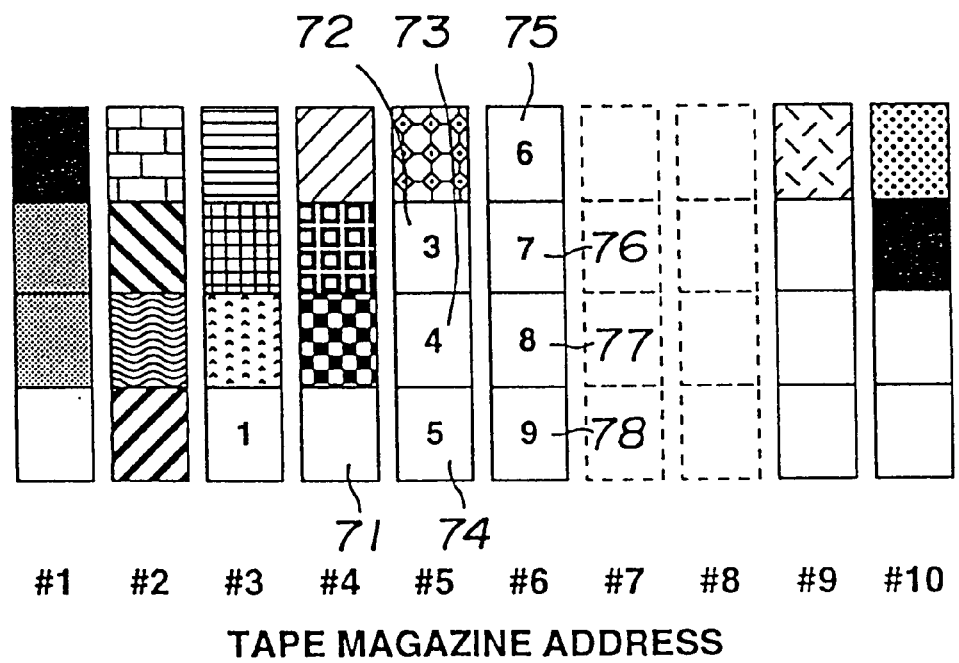
FIG. 14 illustrates free timer recording modes.

Specifically, for recording a 60-minute program, the CPU 11 causes recording to be made by the EP mode in e.g., a one-fourth vacant area 71 of a video cassette housed within the tape magazine #4, as shown in FIG. 14.

For recording a 60-minute program, the CPU 11 causes recording to be made by the EP mode in vacant areas 72 and 73 of a video cassette housed within the tape magazine #5. For recording a 180-minute program, the CPU 11 causes recording to be made by the EP mode in vacant areas 72, 73 and 74 of the video cassette housed within the tape magazine #5. On the other hand, for recording a 240-minute program, the CPU 11 causes recording to be made by the EP mode in vacant areas 75, 76, 77 and 78 of a video cassette housed within the tape magazine #6.

If the CPU 11 has not been able to detect suitable vacant areas at the time of appointment for timer recording, the CPU causes that effect to be displayed on an LCD panel of the interfacing circuit 16, and requests the user to load a new video cassette. If there is no allowance for loading a new cassette, the CPU 11 demands tape exchange. If a sole program has to be recorded on plural video cassettes, the CPU issues an admonition to the user to get his or her consent before accepting setting registration for timer recording.

Figure 15:
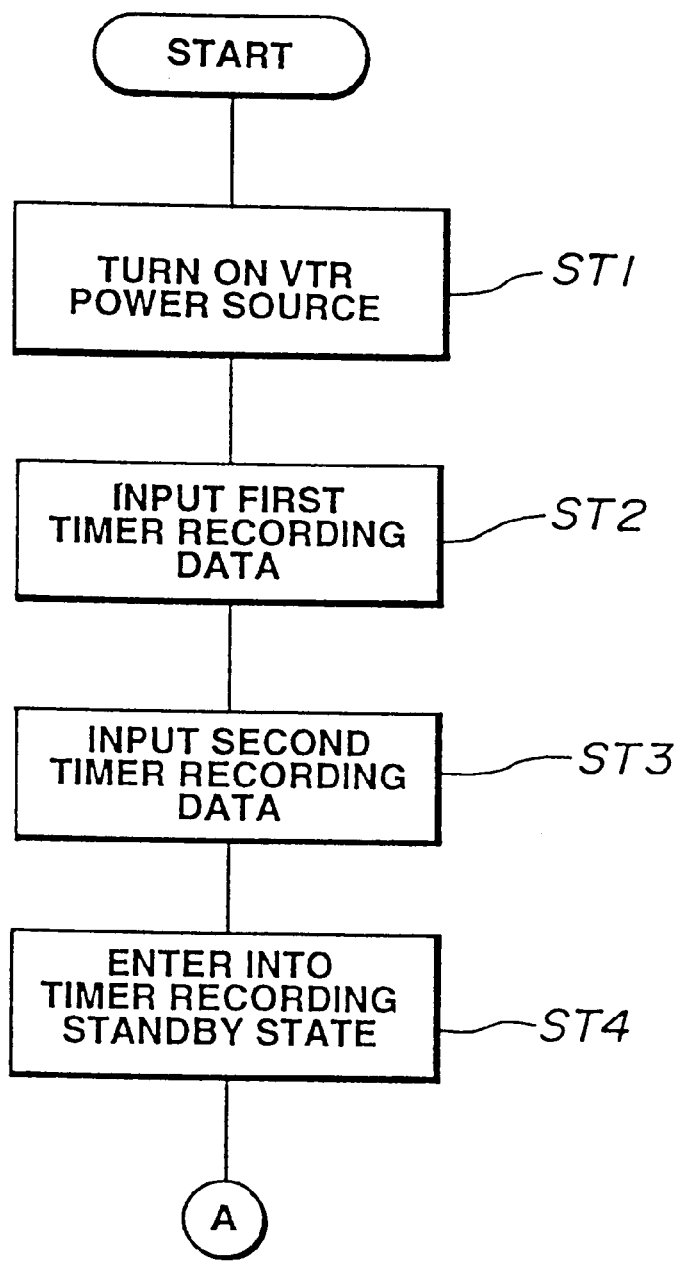
FIG. 15 is a flow chart for illustrating the sequence of VTR timer recording.
Figure 16:
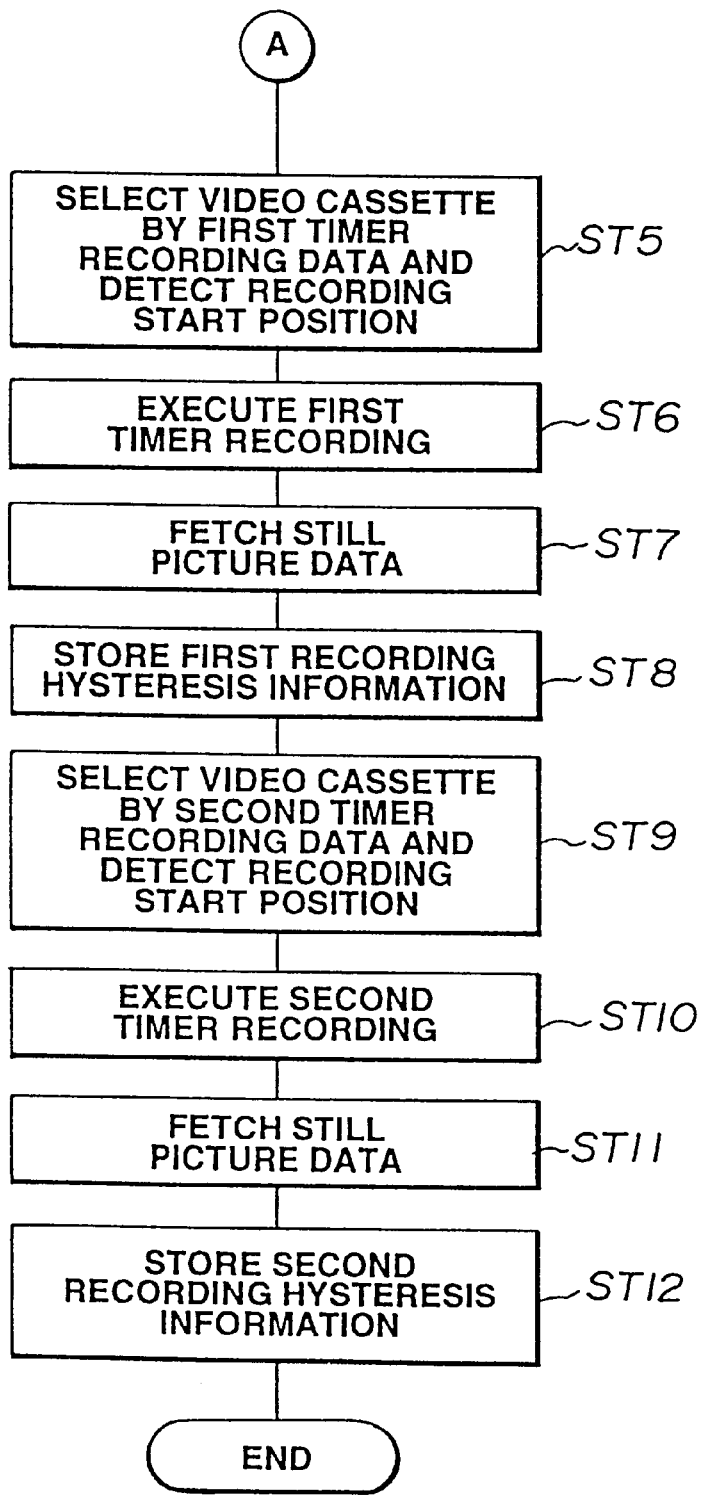
FIG. 16 is a flow chart for illustrating the operation of VTR timer recording.
Figure 24:
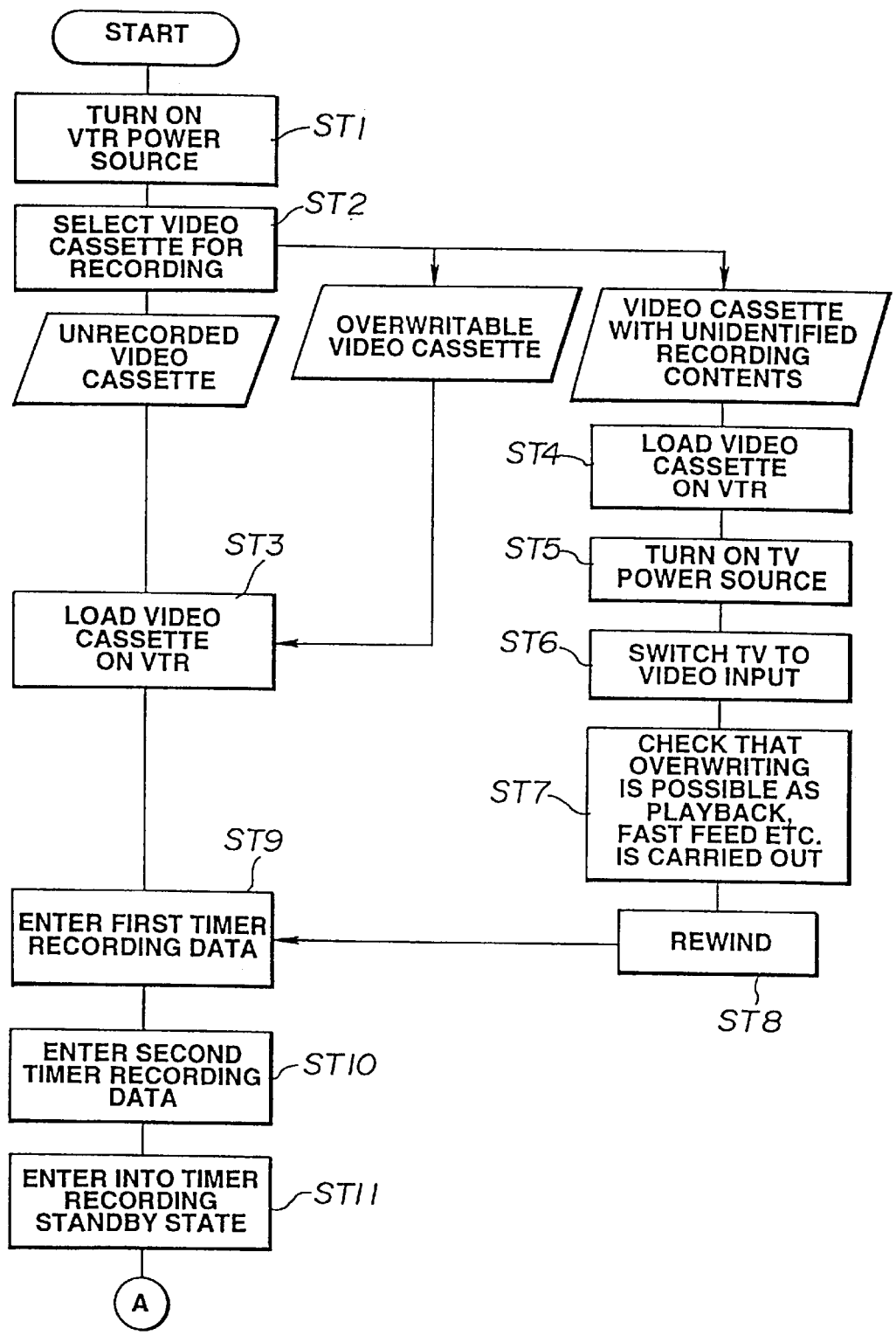
FIG. 24 is a flow chart for illustrating the operation of timer recording by a conventional VTR.
Figure 25:
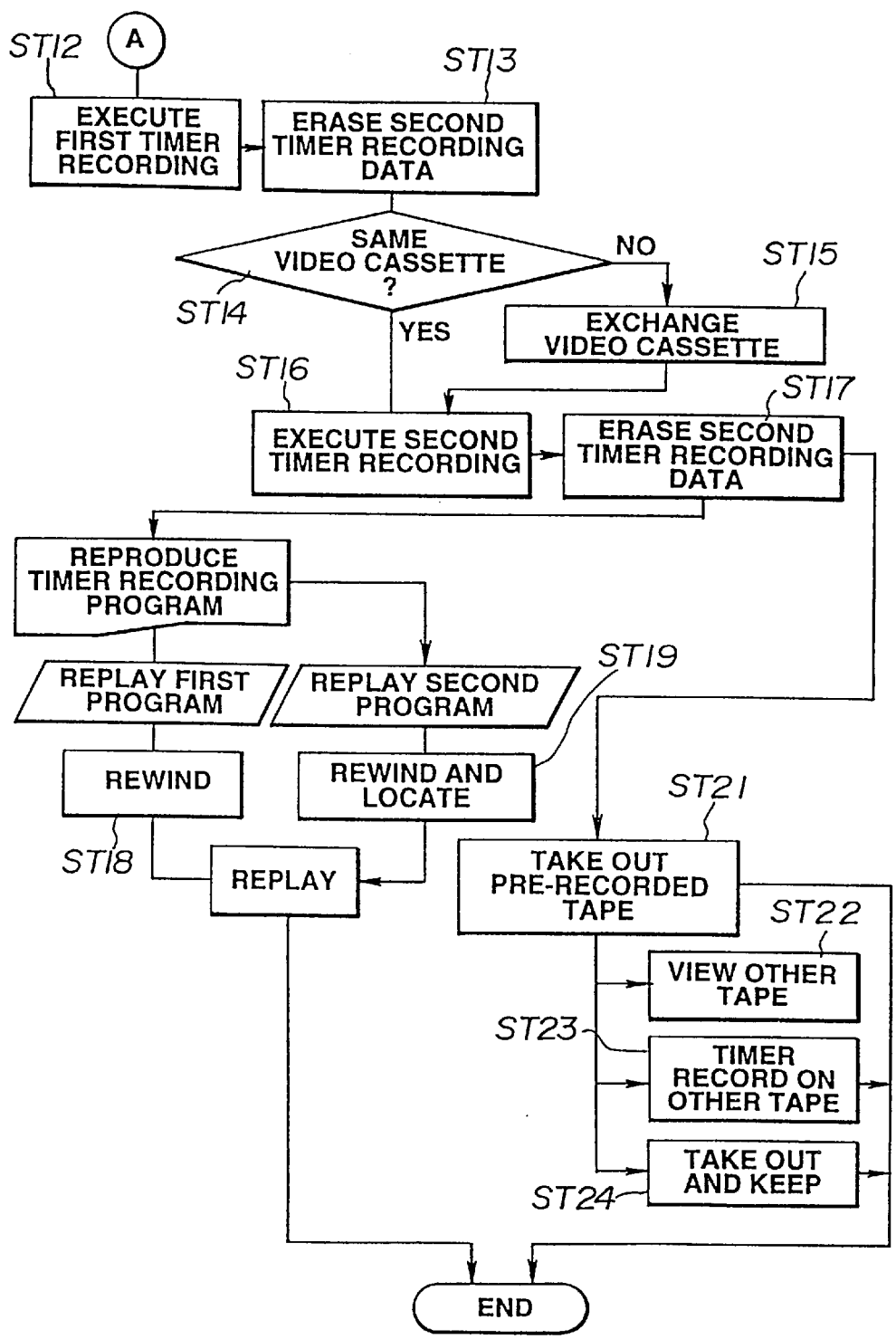
FIG. 25 is a flow chart for illustrating the sequence of reproduction by a conventional VTR.

Thus, by recording the identification information for identifying the video cassette, such as tape absolute time data or recording time and date data, in the video cassette as the recording medium, and by storing the recording information indicating the picture recording contents corresponding to the identification information, such as the recording hysteresis information, it becomes possible for the VTR itself to identify the video cassette by the identification information recorded on the video cassette, while it becomes possible for the user to make timer recording by a simplified operation without the necessity of reproducing the video cassette before recording for ascertaining whether or not recording is possible. More specifically, it is possible with the present VTR to make an appointment for timer recording as shown by flow charts of FIGS. 15 and 16, by a simpler operation than with a conventional VTR, the operation of which is shown in flow charts shown in FIGS. 24 an 25.

That is, at step STI, the user turns on a power source of a VTR, in which a required number of video cassettes are previously housed and in which parameters such as those of a timer recording mode, such as the "program-based allocation mode", are previously set. The user then moves to step ST2.

At step ST2, the user performs appointment operations for timer recording as to recording time and date, recording channel or the like for entering first timer recording data to the VTR, before moving to step ST3.

At step ST3, the user enters appointment data for second timer recording, if necessary, before moving to step ST4.

At step ST4, the user sets the stand-by for timer recording, whereby the VTR enters into the stand-by state.

At step ST5, when the time is the recording time and date for the first installment, the CPU 11 selects a video cassette, based on the first appointment data for timer recording, and detects the recording start position, before moving to step ST6.

At step ST6, the CPU 11 executes the first timer recording, as appointed, before proceeding to step ST7.

At step ST7, the CPU 11 causes still picture data for indexing to be stored in the memory 14, before proceeding to step ST8.

At step ST8, the CPU 11 causes the first recording hysteresis information to be stored in the memory 13, based on the first appointment data for timer recording, before proceeding to step ST9.

At step ST9, when the time is the recording time and date for the second installment, the CPU 11 selects the video cassette, based on the second data for timer recording, while detecting the recording start site, before proceeding to step ST10.

At step ST10, the CPU 11 executes the second timer recording, as appointed, before proceeding to step ST11.

At step ST11, the CPU 11 causes the still picture data for indexing to be stored in the memory 14, before proceeding to step ST12.

At step ST12, the CPU 11 causes the second recording hysteresis information to be stored in the memory 13, based on the second appointment data for timer recording.

In the above-described embodiment, appointment for timer recording a made using the remote controller 50. In the present VTR, appointment for timer recording may also be made over the telephone circuit as when the user is outdoors and has become aware that he or she has forgot making the appointment for timer recording. Specifically, the telephone line connection terminal 35 is connected to the telephone circuit, and a video cassette that can be freely recorded is previously housed in the changer unit 22, so that the user may enter the timer recording data to the VTR over the telephone circuit. In such case, the VTR may be designed to orally advise the user as to the operational sequence or the contents of timer recording in order to prevent occurrence of mistaken operations.

That is, although an appointment for timer recording could be made over the telephone circuit with certain types of the conventional VTRs, it would be necessary with these VTRs that a recordable tape be previously set and there be a residual tape quantity sufficient to permit the recording. Remote appointments for timer recording can only be made when these requirements are met. It is however not realistic or probable for the user to set the video cassette in the VTR on the assumption that the user would be reminded of having forgot the setting for the appointment for timer recording when he or she is away from home. If the user sets the VTR before leaving, timer recording cannot be achieved if another family member takes out the video cassette for employing the VTR and fails to re-set the video cassette. Conversely, with the present VTR, plural video cassettes may be housed, and remote appointment over the telephone becomes possible.

The playback operation by the present VTR is now explained.

When the video cassette to be reproduced is housed within the changer unit 22, the identification information recorded on the video cassette, such as the tape absolute time data or the recording time and date, is reproduced by the mechanical deck 21. Based on the identification information, the CPU 11 identifies the video cassette housed therein. When the user thrusts a button switch 59c "program retrieval mode" of the remote controller 50, the CPU 11 enters into the "program retrieval mode".

Figure 17:
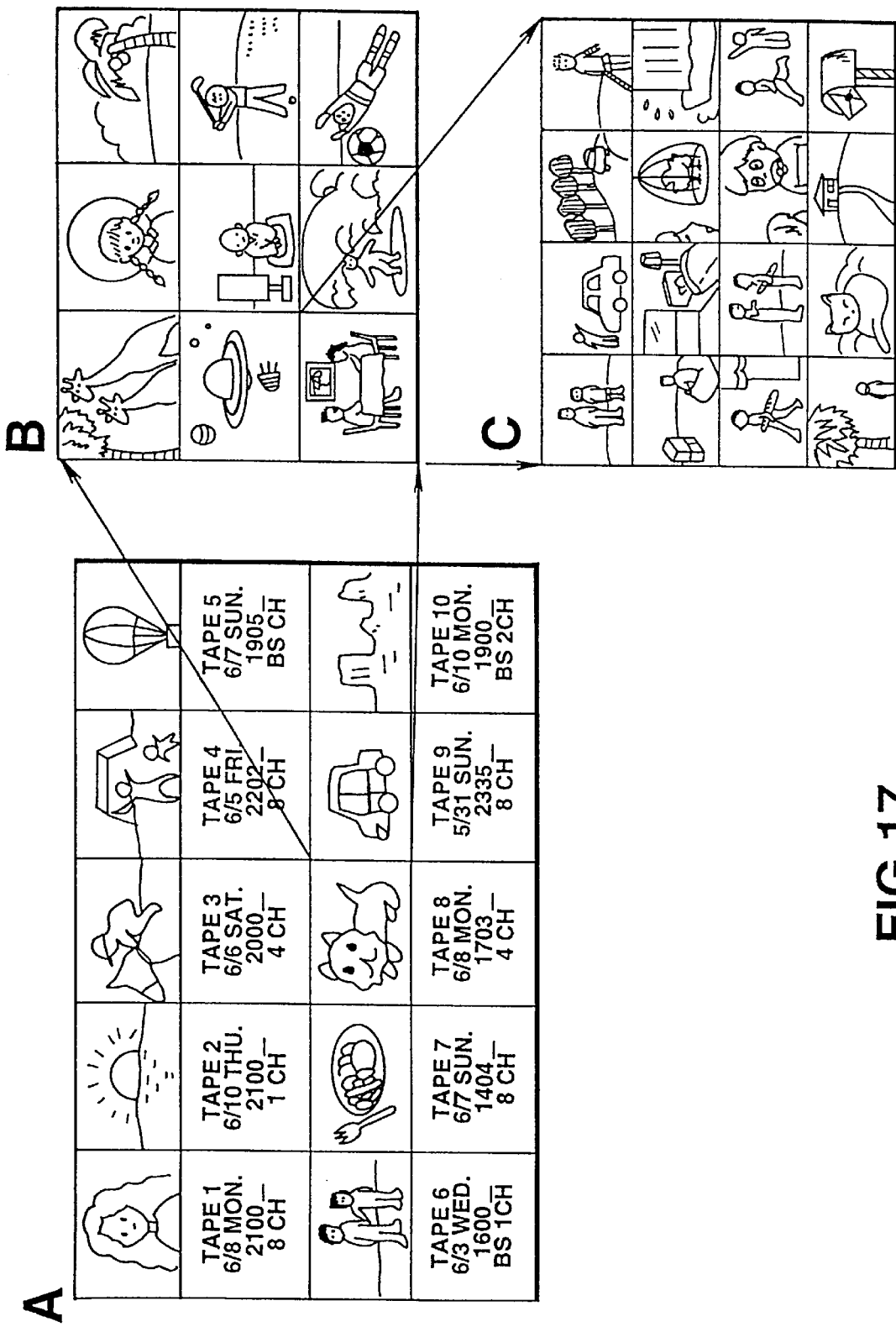
FIG. 17 illustrates a display example of a still picture for indexing.

In the "program retrieval mode", the CPU 11 reads out the recording hysteresis information stored in the memory 13 and detects the latest recording program of each video cassette, based on the recording time and date data of the read-out recording hysteresis information, in order to transmit the recording time and date data for these programs and the recording channel data to the digital signal processing circuit 15. The CPU 11 also reads out the first still picture data of each program stored in the memory 14 in order to transmit the data to the digital signal processing circuit 15. The digital signal processing circuit 15 generates characters based on the recording date and time data and the recording channel data and superimposes these characters and the still picture data before converting the superposed data into analog signals. The produced picture signals are transmitted over the analog signal processing circuit 23 and the output terminal 33 to a TV receiver. The result is that a still picture (one scene) of each latest program recorded in each of the ten video cassettes housed within the changer unit 22, is displayed along with recording time and date data, as a multi-picture, as shown in FIG. 17A. Thus the user may be readily informed of the latest program recorded in each video cassette.

If the user has moved, by e.g. a cursor movement key 59a, to a still picture associated with a video cassette housed within e.g. a tape magazine address #9, and presses the button switch 59d, the CPU 11 reads out the totality of the recording hysteresis information for the designated video cassette and reads out still picture data of each program recorded in the video cassette based on the still picture addresses of the recording hysteresis information in order to transmit the read-out data to the digital signal processing circuit 15. As a result, the first still picture of each of the plural programs recorded in the selected video cassette is displayed as the multi-picture as shown for example in FIG. 17B. Thus the user may be readily informed of the plural programs recorded in the designated video cassette.

If, after moving the cursor to the still picture of the desired program, the user presses the button switch 59d, the CPU 11 reads out the still picture address associated with the designated program from the memory 13 and reads out the still picture data from the memory 14 based on the still picture address in order to transmit the read-out data to the digital signal processing circuit 15. As a result, the still pictures (each one scene) for the selected program, each having a duration of 15 seconds, is displayed as a multi-picture as shown in FIG. 17C. Thus the user may be readily informed of respective scenes of the selected program.

If the user has moved the cursor to the still picture of the desired scene and subsequently presses the playback button switch 58e, the CPU 11 immediately starts playback beginning from such scene. Thus, by recording the identification information for identifying the video cassette, such as tape absolute time data or recording date and time data, on the video cassette, and by storing the still picture data corresponding to the identification information as the recording information indicating the recorded picture, it becomes possible with the present VTR to hierarchically display still pictures of plural video cassettes housed within the VTR, still pictures of plural programs recorded in one of the video cassettes and plural scenes of one of these programs, as indices, thus permitting the user to locate and view the desired program from plural video cassettes by a simplified operation.

Figure 20:
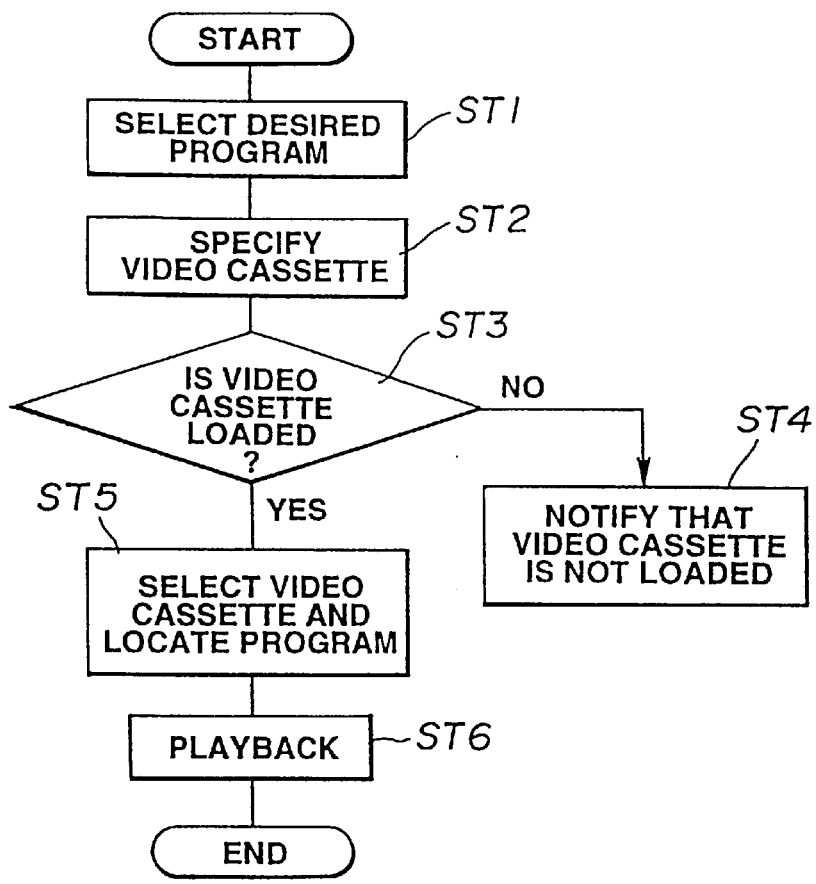
FIG. 20 is a flow chart for illustrating the reproducing operation by the VTR.

That is, the user views the still picture for indexing, displayed as a multi-picture on a TV receiver, at step ST1 in a flow chart of FIG. 20, and selects a desired program, before moving to step ST2.

At step ST2, the CPU 11 specifies a video cassette having the desired program recorded therein, based on the recording hysteresis information for the selected still picture, before proceeding to step ST3.

At step ST3, the CPU 11 judges, based on the tape ejection information data of the recording hysteresis information, whether or not the video cassette having recorded therein the program specified by the user is housed within the changer unit 22. If the result of judgement is YES, the CPU proceeds to step ST5 and, if otherwise, to step ST4.

At step ST4, the CPU 11 displays on the interfacing circuit 16 that the desired program has not been housed in the VTR and advises the user of that effect.

At step ST5, the CPU 11 selects the video cassette or locates the leading end of the program specified by the user, before proceeding to step ST6.

At step ST6, when the user presses the button switch 58e, the CPU 11 causes the playback operation to be initiated.

Figure 23:
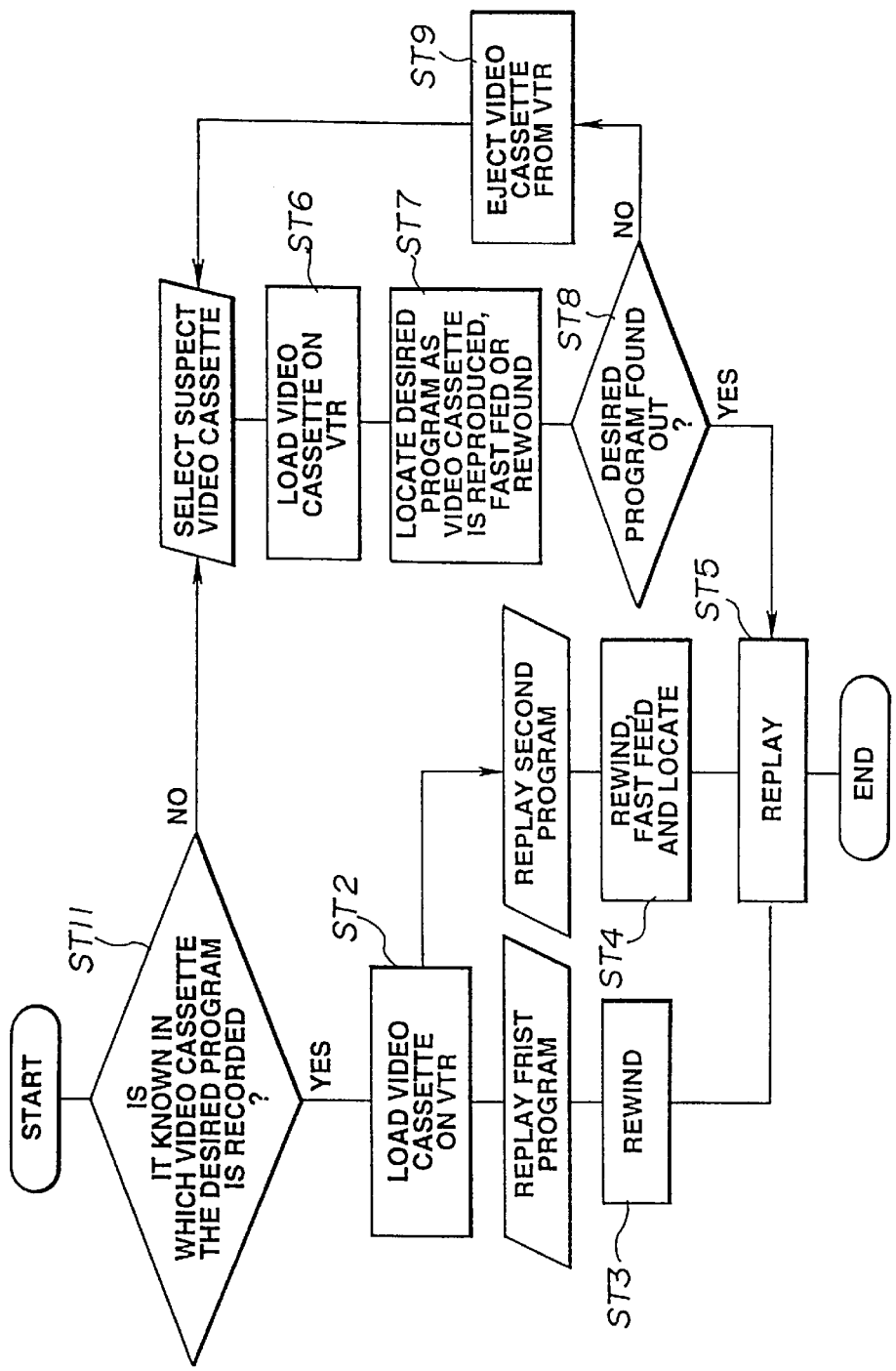
FIG. 23 is a flow chart for illustrating the sequence of timer recording by a conventional VTR.

Thus the desired program may be reproduced by a number of steps smaller than with the flow chart for the conventional VTR shown in FIG. 23, that is by a simpler sequence of operations. At any hierarchical level, the playback operation may also be started directly when the user thrusts the button switch 58e as pointed by the cursor. Alternatively, at the initial time point when the program is first reproduced, an inquiry may be made to the user as to whether or not a new program may be recorded in superimposition on the initially reproduced program, such as by corresponding display on the interfacing circuit 16, and the user' response may be stored in the tape playback hysteresis data as the recording inhibiting or recording protective data.

The present VTR is also designed to sequentially reproduce the programs not hitherto reproduced on pressing the button switch 55 of the remote controller 55. That is, when the CPU 1 once reproduces the program, it rewrites the tape playback hysteresis data of the recording hysteresis information corresponding to the reproduced program to "pre-reproduced".

Figure 18:
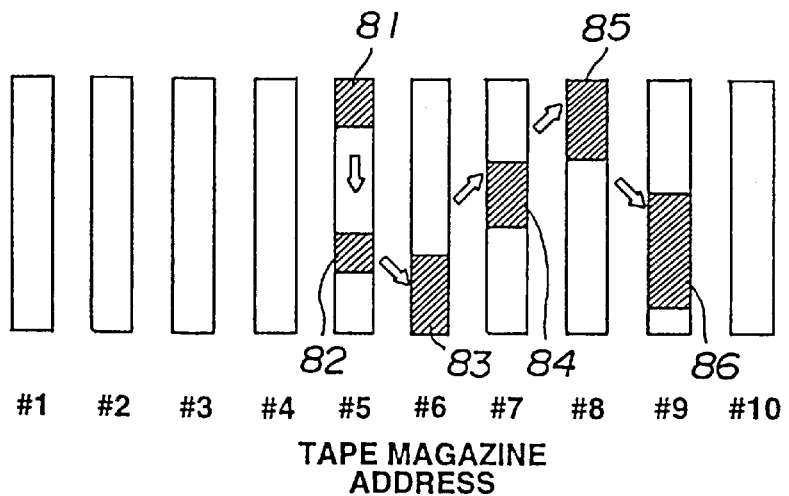
FIG. 18 illustrates the reproducing operation by the VTR.

The CPU 11 then detects the non-reproduced program, based on the tape playback hysteresis information for each video cassette housed within the changer unit 22, and reproduces non-reproduced programs 81 to 86 of plural video cassettes housed in the tape magazines #5 to #9, as shown in FIG. 18.

Figure 19A:
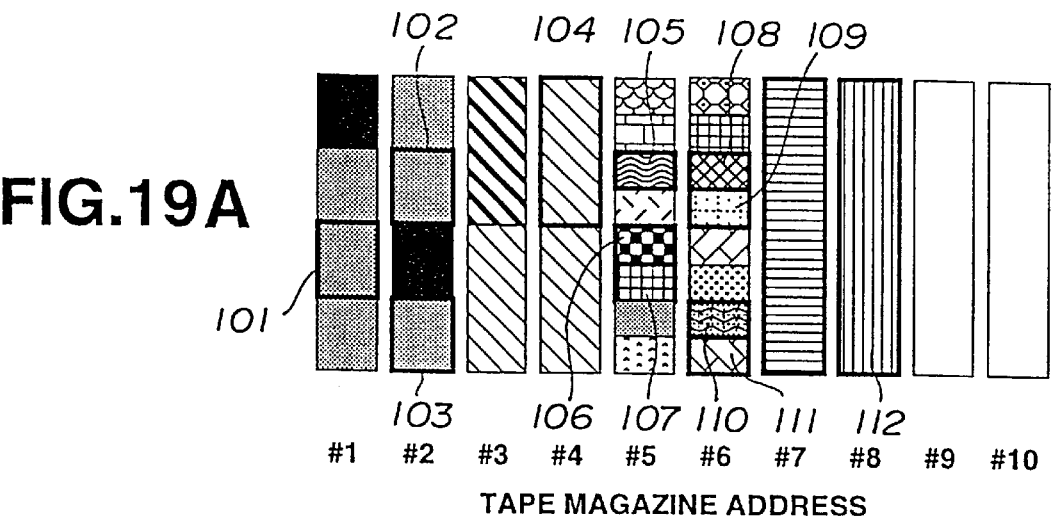
FIGS. 19A–19B illustrates the reproducing operation by the VTR.
Figure 19B:
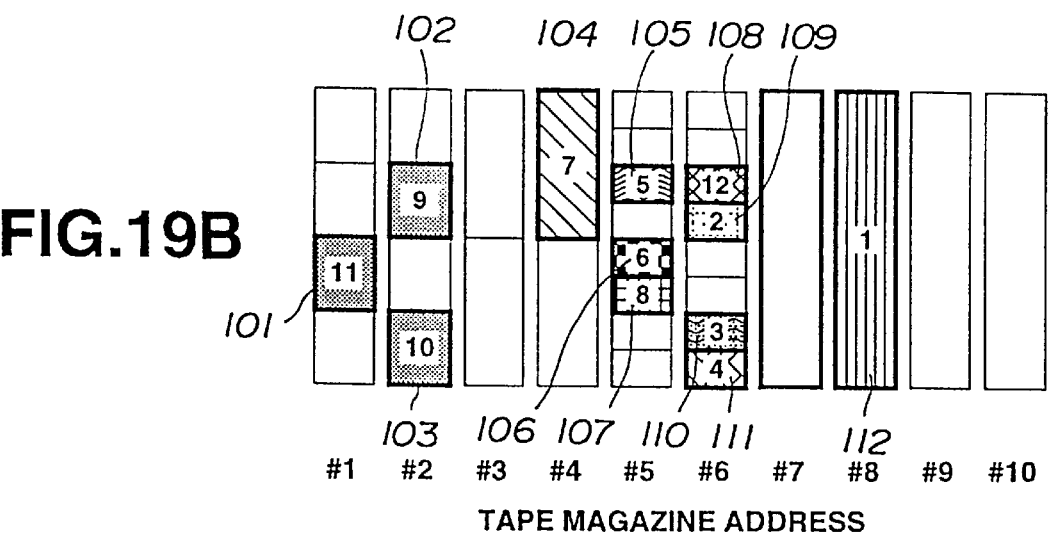

It is now assumed that the programs are fully recorded in the video cassettes having the tape magazine addresses #1 to #8, the programs 101 to 112 of these video cassettes have not been reproduced, that is the tape playback hysteresis data of the recording hysteresis information for these programs indicate "not yet reproduced", as shown in FIG. 19A. It is also assumed that the programs are old in the sequence of 112, 109, 110, 111, 105, 106, 104, 107, 102, 103, 101 and 108, that is the recording time and date data of the recording hysteresis for each program is old in the above sequence, as shown in FIG. 19B. Then, when the button switch 55 is pressed, the CPU 11 reads out the recording hysteresis information and reproduces the programs in the chronological recording sequence based upon the recording time and date data and the tape playback hysteresis data. If now the button switch 56 is pressed during playback of the program 110, the CPU 11 discontinues the playback of the program 110 to start the playback of the program 111.

With the present VTR, as described above, the identification information for identifying the video cassette, such as the tape absolute time data and recording time and date data, is recorded on the video cassette, and the recording information showing the recording contents such as the recording hysteresis information for the identification information is stored in the memories 13 and 14. During reproduction, the identification information is reproduced from the video cassette, and the recording hysteresis information corresponding to the identification information is read out from the memories 13 and 14. By reproducing the program not hitherto reproduced based on the tape reproduction hysteresis data of the recording hysteresis information, the user may view the program not hitherto reproduced by a simplified operation.

The present invention is not limited to the above-described embodiments. For example, it is possible to automatically edit plural discretely recorded programs using the recording hysteresis information stored in the memory 13, or to record the long program in plural video cassettes if the program cannot be recorded in the single video cassette.

Figure 21:
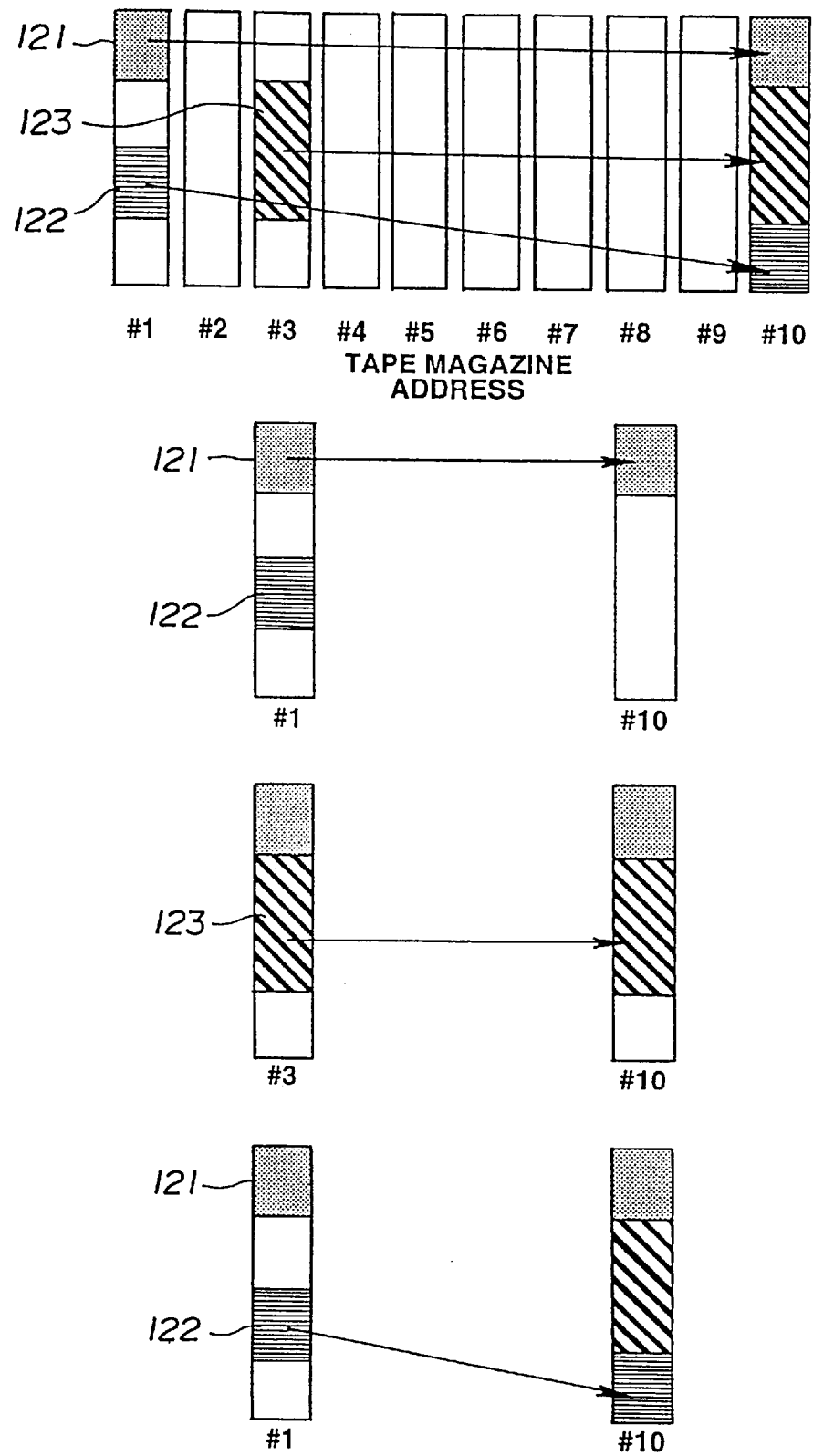
FIG. 21 illustrates the automatic editing operation by the VTR.

Specifically, two mechanical decks, namely a first deck and a second deck, are provided in the VTR, and programs 121, 122 and 123, discretely recorded in the video cassettes having the tape magazine addresses #1 and #3, are reproduced by the first deck, and the resulting picture signals are recorded in the sequence of the programs 121, 122 and 123 in the video cassette having e.g., a tape magazine address #10 by the second deck, at the same time as the recording hysteresis information is updated, as shown in FIG. 21. In this manner, the discretely recorded programs may be automatically recorded in one video cassette. The program sequence may also be specified, if so desired.

By recording on the first video cassette by e.g., the first deck, and by recording on the second video cassette by the second deck at a time point of completion of recording by the first video cassette, a program with a long playing time, which cannot be recorded in one tape, may also be automatically continuously recorded without interruption in the recording contents.

Figure 22:
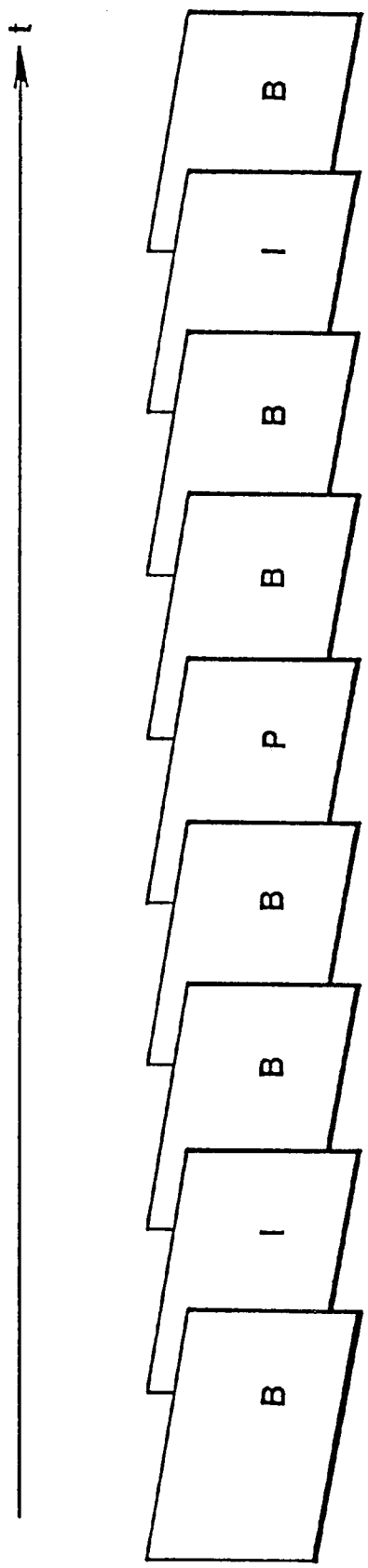
FIG. 22 illustrates the relation between respective pictures in MPEG.

The picture signal recording/reproducing apparatus may also be a magneto-optical disc apparatus, instead of the VTR of the above-described embodiment. If, by exploiting high-speed random accessibility of the magneto-optical disc device, the picture signals are recorded on the magneto-optical disc by intra-coding the data by high efficiency encoding as prescribed by MPEG, as shown in FIG. 22, the field or frame picture data I in FIG. 33 may be directly read out from the disc as still picture data for display on the TV receiver, instead of storing indexing still picture data in the memory 14. That is, the memory 14 may be omitted.

Industrial Applicability

With the above-described picture signal recording/reproducing apparatus of the present invention, by storing the identification information for identifying the recording medium in memory means, reproducing the recording information recorded in the recording medium during reproduction, reading out the recording information stored in the storage means based on the identification information and displaying the read-out information on, for example, a TV receiver, the user is able to easily recognize the contents recorded on the recording medium.

On the other hand, with the picture signal recording/reproducing apparatus of the present invention, by storing in memory means the information as to whether or not a pre-recorded program has hitherto been reproduced, reproducing the identification information recorded on the recording medium, and by reading out the information as to whether or not a pre-recorded program has hitherto been reproduced from the memory means based on the identification information, it becomes possible for the user to easily recognize whether or not the recorded program has hitherto been reproduced, or to reproduce only the program not hitherto reproduced based on the information as to whether or not a pre-recorded program has hitherto been reproduced.

What is claimed is:

1. A video signal recording and reproducing apparatus comprising;

housing means for housing a plurality of recording media;

recording means housed in said housing means for recording, onto said recording media, a video signal and identification information for identifying said recording media;

memory means housed in said housing means for storing information about said video signal and for storing content information, said content information including at least one field of said video signal;

reproducing means housed in said housing means for reproducing said video signal and said identification information from the recording media;

display means for displaying said content information of the video signal recorded on said recording media;

first operating means for outputting a signal commanding the display of said content information; and control means for controlling said recording means, memory means, reproducing means and display means responsive to the signal of said first operating means;

wherein said control means cause said identification information to be recorded on the recording media when said video signal is recorded on said recording media and also cause said content information to be stored in said memory in association with said identification information; and wherein said control means further cause the identification information to be reproduced from the housed recording media.

2. The apparatus as claimed in claim 1 further comprising a second operating means for outputting a signal specifying a portion of said content information displayed on said display means.

3. The apparatus as claimed in claim 2, wherein said portion of said content information specified by a signal from said second operating means is a frame of said video signal displayed on said display means;

wherein when said specifying signal is received from said second operating means, said controlling means retrieves information from said memory means regarding said specified portion of said content information.

4. The recording and reproducing apparatus of claim 1, further comprising means for connecting a telephone line to said recording means.

5. The recording and reproducing apparatus of claim 1, wherein said identification information further comprises includes tape management numbers, tape ejection information, and channel data.

6. The recording and reproducing apparatus of claim 3, wherein said second operating means thins out pixels contained within said content information.

7. The recording and reproducing apparatus of claim 1, wherein said control means coordinates dubbing of multiple video signals.

8. The recording and reproducing apparatus of claim 1, wherein said recording means divides said recording media into libraries, wherein the content of said libraries is cyclically displayed on said display means.

9. The recording and reproducing apparatus of claim 1, wherein said control means prevents the mistaken erasure of recorded video information.

10. The recording and reproducing apparatus of claim 1, wherein said control means manages the recording across multiple video cassettes, and prompts the user accordingly.

11. The recording and reproducing apparatus of claim 1, wherein said control means manages the reproduction of recordings including tracking whether recorded video information has been viewed or not.

* * * * *